(12) United States Patent
Heber et al.

(10) Patent No.: US 11,668,961 B2
(45) Date of Patent: Jun. 6, 2023

(54) OPTICAL ARRANGEMENT FOR GENERATING LIGHT FIELD DISTRIBUTIONS AND METHOD FOR OPERATING AN OPTICAL ARRANGEMENT

(71) Applicants: Fraunhofer-Gesellschaft zur Foerderung der angewandten Forschung e.V., Munich (DE); Technische Universitaet Dresden, Dresden (DE)

(72) Inventors: Joerg Heber, Dresden (DE); Matthias Roth, Dresden (DE); Klaus Janschek, Dresden (DE)

(73) Assignees: Fraunhofer-Gesellschaft zur Foerderung der angewandten Forschung e.V., Munich (DE); Technische Universitaet Dresden, Dresden (DE)

( * ) Notice: Subject to any disclaimer, the term of this patent is extended or adjusted under 35 U.S.C. 154(b) by 770 days.

(21) Appl. No.: 16/355,424

(22) Filed: Mar. 15, 2019

(65) Prior Publication Data
US 2019/0212544 A1 Jul. 11, 2019

Related U.S. Application Data

(63) Continuation of application No. PCT/EP2017/073315, filed on Sep. 15, 2017.

(51) Int. Cl.
*G02F 1/01* (2006.01)
*G02F 1/1333* (2006.01)
(Continued)

(52) U.S. Cl.
CPC ............... *G02F 1/01* (2013.01); *G02B 26/06* (2013.01); *G02B 27/46* (2013.01); *G02F 1/1333* (2013.01);
(Continued)

(58) Field of Classification Search
CPC .... G02F 1/01; G02F 2203/12; G02F 2203/50; G02B 26/06; G02B 27/46; G03H 2225/30; G03H 2225/33; G03H 2225/34
See application file for complete search history.

(56) References Cited

U.S. PATENT DOCUMENTS 5,148,157 A 9/1992 Florence
5,416,618 A 5/1995 Juday
(Continued)

FOREIGN PATENT DOCUMENTS

DE 102009044910 A1 12/2010
EP 2073198 A1 6/2009
(Continued)

OTHER PUBLICATIONS

Chandrasekaran, Sri Nivas, et al., "Using Digital Micromirror Devices for focusing light through turbid media", Emerging Digital Micromirror Device Based Systems and Applications VI, vol. 8979, doi: 10.1117/12.2038893, 2014, p. 897905.
(Continued)

*Primary Examiner* — Jessica M Merlin
(74) *Attorney, Agent, or Firm* — Perkins Coie LLP; Michael A. Glenn

(57) ABSTRACT

A phase and phase/amplitude spatial light modulator arrangement for generating a complex-valued light field with a spatial light modulator, a phase element and an optical system. The phase and amplitude spatial light modulator arrangement is configured to generate a light field that is adjustable in amount and phase.
A method realizes operation of a combined spatial light modulator for generating a complex-valued light field. Here, the method includes adapting an optical characteristic in several areas of a phase element.
(Continued)

A further method realizes operation of an optical arrangement for modulating different light wavelengths by adjusting several wave influences in several areas of a phase modulator.

A last method realizes operation of an optical arrangement by adjusting an amplitude spatial light modulator for modulating light intensities in at least two optical paths.

41 Claims, 9 Drawing Sheets

(51) Int. Cl.
  *G02B 26/06* (2006.01)
  *G02B 27/46* (2006.01)
  *G02F 1/13* (2006.01)

(52) U.S. Cl.
  CPC ........ *G02F 1/1313* (2013.01); *G02F 2203/12* (2013.01); *G02F 2203/50* (2013.01); *G03H 2223/13* (2013.01); *G03H 2225/30* (2013.01); *G03H 2225/55* (2013.01)

(56) References Cited

U.S. PATENT DOCUMENTS

| | | | |
|---|---|---|---|
| 6,021,223 | A | 2/2000 | Toyoda et al. |
| 9,529,326 | B2 | 12/2016 | Kroll et al. |
| 10,234,821 | B2 | 3/2019 | Futterer et al. |
| 2009/0161519 | A1 | 6/2009 | Yamamoto et al. |
| 2009/0195857 | A1 | 8/2009 | Branson et al. |
| 2009/0310206 | A1 | 12/2009 | Gluckstad |
| 2014/0118645 | A1 | 5/2014 | Sung et al. |
| 2015/0205262 | A1* | 7/2015 | Won ............... G02B 27/4205 359/9 |
| 2016/0231582 | A1* | 8/2016 | Yamaguchi ......... G02B 27/286 |

FOREIGN PATENT DOCUMENTS

| | | |
|---|---|---|
| JP | 2009146542 A | 7/2009 |
| WO | 2008001137 A2 | 1/2008 |
| WO | 2009130603 A2 | 10/2009 |
| WO | 2012084752 A1 | 6/2012 |

OTHER PUBLICATIONS

Florence, James M, et al., "Full Complex Spatial Filtering with a Phase Mostly DMD", SPIE Wave Propagation and Scattering in Varied Media II, vol. 1558, 1991, pp. 487-498.

Hillman, Timothy R, "Digital optical phase conjugation for delivering two-dimensional images through turbid media", Sci. Rep., vol. 3, DOI: 10.1038/srep01909, May 29, 2013, pp. 1-5.

Lee, Wai Hon, "Sampled Fourier Transform Hologram Generated by Computer", Appl. Opt., vol. 9, No. 3, Mar. 1970, pp. 639-643.

Van Putten, E. G, et al., "Spatial amplitude and phase modulation using commercial twisted nematic LCDs", Appl Opt, vol. 47, No. 12, Apr. 20, 2008, pp. 2076-2081.

Vellekoop, Ivo M, "Feedback-based wavefront shaping", Opt. Express, vol. 23, No. 9, Apr. 30, 2015, pp. 12189-12206.

\* cited by examiner

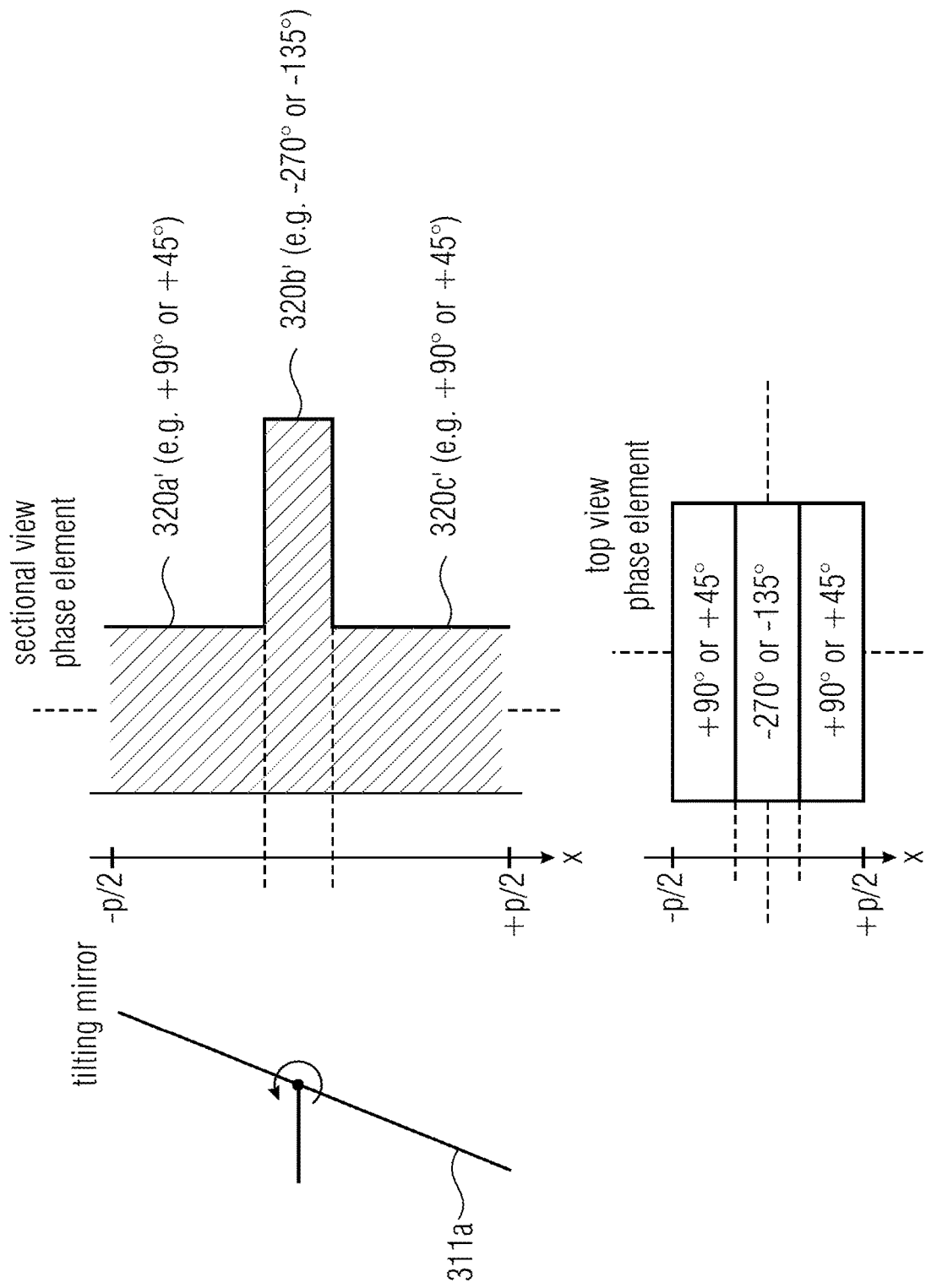

700

Adjusting a phase or amplitude/phase spatial light modulator to modulate light intensities in at least two optical paths that pass through areas of the phase or amplitude/phase spatial light modulator that are mapped in a superimposed manner and in which phase modulations to a differing degree are performed; wherein in a first adjustment state a first distribution of the phases in the at least two optical paths exists and thereby light of a first phase position is obtained; and wherein in a second adjustment state a second distribution of the phases in the at least two optical paths exists that differs from the first distribution of the light intensities and thereby light of a second phase position is obtained.  — 710

Fig. 7

OPTICAL ARRANGEMENT FOR GENERATING LIGHT FIELD DISTRIBUTIONS AND METHOD FOR OPERATING AN OPTICAL ARRANGEMENT

CROSS-REFERENCE TO RELATED APPLICATIONS

This application is a continuation of copending International Application No. PCT/EP2017/073315, filed Sep. 15, 2017, which is incorporated herein by reference in its entirety, and additionally claims priority from German Application No. EP 102016217785.0, filed Sep. 16, 2016, which is also incorporated herein by reference in its entirety.

An embodiment of the present invention relates to an optical arrangement for generating light field distributions. A further embodiment relates to a method for operating an optical arrangement. A further embodiment relates to a method for modulating light in amplitude and phase by using zero-order diffraction. A further embodiment relates to a method for modulating light in amplitude and polarization. A further embodiment relates to a method for modulating light in amplitude, phase and polarization.

BACKGROUND OF THE INVENTION

Spatial light modulators (SLM) are programmable optical devices impressing a spatial modulation onto light fields. SLMs consist of modulator cells (pixels), each having an adjustable parameter which is frequently controlled by an electric voltage. Regarding their wave nature, light fields are generally described vectorially in the range of complex numbers. For example, an amplitude can be influenced by a phase effect. Alternatively, the spatial light modulator can also be realized differently, such as by a liquid-crystal structure.

So-called complex-valued spatial light modulation adjusts simultaneously both the amplitude and the phase of a light source. However, with conventional light modulators, this vectorial light modulation can only be realized with additional system complexity.

The conventional technology concerning complex-valued light modulation is divided into two categories—on the one hand, sequential imaging on two specialized programmable modulators (e. g. amplitude and phase) [1]. On the other hand, an individual modulator can be used. Then, pixel groups (macro pixels) are defined, within which the complex function is allocated to several pixels (macro pixel methods).

Macro-pixel methods for complex-valued modulation are based on Lee holography [2], which allows the usage of an amplitude modulator for phase modulation. The work of van Putten et al. [3] extends the concept of Lee to complex modulation. Both Lee and van Putten et al. use the first-order diffraction of a pattern programmed into the SLM (see FIG. 7). For this, the modulator is tilted by the angle φ and different phase allocations of the pixels within a complex modulation cell (macro pixel) are obtained.

FIG. 7 illustrates the concept according to van Putten et al., the same uses the first-order diffraction of a pattern programmed into the SML [3]. All other orders of diffraction are excluded from the optical path by the aperture. The position of the first diffraction maximum in the focus plane is linearly dependent on the wavelength λ. All orders of diffraction with the exception of the first are excluded from the optical path by means of an aperture. At the same time, the aperture effects optical low-pass filtering, such that the contributions of the pixels in a modulation cell are superimposed to a complex value.

Alternatively, a concept exists by which a complex field can be generated by a phase modulator with discrete pixels [4]. By superimposing two phase-modulated vectors, the entire phase space is covered.

Further, a component concept allowing complex modulation by modifying a reflective tilting mirror SML by means of manufacturing technology exists [5].

The source [10] describes a completely complex local filtering with a so-called "phase mostly deformable mirror device".

With respect to the above, there is the desire to provide a novel concept for complex-valued modulation of a light field which allows the realization of an improved tradeoff between manufacturing technology requirements, availability of the used devices and resolution of the complex-valued light field or the possibility of using a system for modulating different light wavelengths.

SUMMARY

According to an embodiment, an optical arrangement for generating light field distributions that can be adjusted with varying amplitude and phase may have: a programmable spatial light modulator; a phase element and an optical system; wherein the phase element is configured to effect at least two or more phase contributions on adjacent modulator image points; wherein the optical system is configured to image several areas of the spatial light modulator in a superimposed manner; wherein the spatial light modulator and the phase element are arranged within a depth of field of a plane or conjugated optical mask planes, and wherein the spatial light modulator is configured as phase modulator or as combined amplitude and phase modulator and wherein the optical arrangement is configured to realize a predeterminable complex light field distribution in a subsequent image plane; wherein the optical arrangement includes an optical low pass filter for limiting a diffraction intensity in a pupil plane, which is dimensioned such that two or more adjacent image points (pixels) of the spatial light modulator are superimposed to an effective image point in the image plane.

According to another embodiment, a method for operating an optical arrangement with a spatial light modulator and a phase element for generating a complex-valued light field may have the steps of: adapting an optical characteristic in several areas of a phase element in dependence on a useful light wavelength of light contributions to be modulated in order to realize that a phase influence in a respective area of the phase element varies across an area of useful light wavelength by at most 180°.

According to another embodiment, a method for operating an optical arrangement with a spatial light modulator and a phase element for modulating different light wavelengths may have the steps of: adjusting several phase influences in several areas of a phase element belonging to a complex modulation cell in dependence on a light wavelength of the light contributions to be modulated that are modulated by a complex modulation cell in order to keep a phase influence realized in respective areas of the phase element constant across a predetermined area of useful light wavelength with a tolerance of at most 180°.

According to another embodiment, an optical arrangement for generating light field distributions that can be adjusted with varying amplitude and polarization may have:

a programmable spatial light modulator; a polarization element; and an optical system; wherein the polarization element is configured to effect at least two or more polarization contributions on adjacent modulator pixels or to apply at least two different polarization filters to adjacent modulator pixels, wherein the optical system is configured to image several areas of the spatial light modulator in a superimposed manner; wherein the spatial light modulator and the polarization element are arranged within a depth of field of a plane or conjugated optical mask planes and wherein the optical arrangement is configured to realize a light value with predeterminable amplitude and predeterminable polarization in a subsequent image plane, wherein the optical arrangement includes an optical low pass filter for limiting a diffraction intensity in a pupil plane, which is dimensioned such that two or more adjacent image points (pixels) of the spatial light modulator are superimposed to an effective image point in the image plane.

An embodiment of the present invention provides an optical arrangement for generating light field distributions that can be adjusted (for example spatially and/or temporally) with varying amplitude and phase. The optical arrangement includes a programmable spatial light modulator (having, for example, one or several tilting mirrors or one or several sink mirrors), a phase element (also referred to as phase modulator) and an optical system. The phase element is configured to effect at least two or more phase contributions on adjacent modulator pixels (modulator image points or modulator sub-image points) (i. e., for example, to add two different phase contributions to light portions of adjacent modulator image points or modulator sub-image points). The optical system is configured to image several areas (for example modulator image points or modulator sub-image points) of the spatial light modulator in a superimposed manner. The spatial light modulator and the phase element are arranged within a depth of field of a plane or conjugated optical mask planes (i. e. for example closely adjacent or at least approximately in planes that are conjugated with respect to one another), such that, for example, an area of the phase element is allocated to a sub-image point of the spatial light modulator or such that at least a one-to-one allocation between areas of the phase element and sub-image points of the spatial light modulator exists or such that, for example, a sub-image point determines which light amplitude impinges on an allocated area of the phase element. The optical arrangement is configured to realize a predeterminable complex light value in a subsequent image plane.

By the phase element, it can be achieved that the respective optical path can be aligned in a complex-valued plane by the different changes of the phases of the different light contributions.

Thus, the invention offers the possibility of generating a complex-valued light field that can be adjusted in amount and phase. The amplitude in the image space is generally determined by a combination of phase element and spatial light modulator. A further characteristic of the inventive solution is the characteristic of the optical system that the same images several areas of the spatial light modulator (also referred to as spatial light modulator individual elements or spatial light modulator sub-image points) in a superimposed manner, wherein the different areas that are superimposed have different phases due to influencing the phase element. Herein, the term "spatial light modulator individual elements" is sometimes used synonymously with the term "areas".

Thus, by changing the adjustments of different areas of the spatial light modulator, the (relative) phases (and optionally also the relative intensities) of light contributions of different phase positions in a single pixel can be changed without having to change the phase element or its adjustment, wherein by adjusting the relative phases (and optionally also the intensities) of the light contributions passing through different areas of the phase element, a resulting phase position of the pixel (and in some embodiments also a resulting amplitude) can be determined. Here, the spatial light modulator can perform "hard" switching between light contributions of different phase positions and/or can obtain a combination of light contributions of different phase positions (whereby an even finer adjustment of a resulting phase position is possible).

Thus, the static (or quasi-static) phase element can be used such that, with a constant light wavelength, phase influence takes place by controlling or switching different areas of the spatial light modulator and additionally by the phase element and that the adjustment of the phase element is, at the most, only changed when the light wavelength is changed. By using different light paths with different phase modulations which all belong to one pixel or image point, the spatial light modulator can be designed in a particularly simple manner since, for example, a phase adjustment area of the spatial light modulator can be selected to be comparatively small. Thus, the phase element supplements the phase-influencing function of the spatial light modulator. For example, the phase element can perform coarse adjustment of a phase position while the spatial light modulator can perform fine adjustment of the phase position. Thus, several equal individual elements of the spatial light modulator can be used together and it is sufficient that the individual elements effect comparatively small phase changes. Thus, in contrary to conventional arrangements, a single element does not have to cover a phase adjustment area of 2 π. Further, the usage of the phase element can significantly change an obtainable adjustment area of an individual phase or amplitude-phase modulator element and can ease or allow, for example, the realization of a phase jump of 180 degrees.

According to an embodiment of the optical arrangement, the optical system is configured to image several adjacent areas of the spatial light modulator in a superimposed manner. This offers the advantage that the light contributions of the different optical paths that are imaged in a superimposed manner by the optical system can interfere.

According to an embodiment of the optical arrangement, the optical system is configured to image several areas or several adjacent areas of the spatial light modulator as a complex modulation cell. This offers the advantage that a (sum) light, which is a result of the superposition of the phases and amplitudes of the different light contributions, can be generated by the contribution or light contribution of the different areas that are advantageously adjacent. For example, the light of an image point (pixel) can be determined by the different areas of the complex modulation cell (which can be considered as sub-pixel or sub-image points) that are imaged in a superimposed manner.

According to a further embodiment of the optical arrangement, the optical system comprises an optical low-pass filter. Here, the optical low-pass filter is configured to superimpose several areas or several adjacent areas of the spatial light modulator to a complex modulation cell or to superimpose light contributions of several areas of the spatial light modulator to an image point. This offers the advantage that the optical low-pass filter generates a sum light comprising a phase and an amplitude which can be adjusted by the spatial light modulator and the phase element.

According to a further embodiment of the optical arrangement, the optical system comprises a low-pass aperture. This low-pass aperture is configured to superimpose several areas or several adjacent areas of the spatial light modulator to a complex modulation cell. This offers the advantage that the low-pass aperture realizes a function of an optical low-pass filter. An adjustable low-pass aperture would also be possible here, which realizes a change of the low-pass filter effect.

According to a further embodiment of the optical arrangement, the spatial light modulator is formed by using, for example, a microelectromechanical system or an analog tilting mirror arrangement or a digital micromirror arrangement or a liquid-crystal arrangement. This offers the advantage that known and commercially available components can be used for the spatial light modulator. Digital micromirror devices (DMD) or liquid-crystal arrangements are embodiments that can be used besides (as an alternative to) an analog tilting mirror arrangement or a microelectromechanical system in an advantageous manner.

According to a further embodiment of the optical arrangement, the phase element comprises a time-invariant influence of the phase. This can also be expressed such that the phase element is static. This offers the advantage that inexpensive devices can be used for the phase element. Further, it can be advantageous that these static phase elements allow very exact influence or adjustment of the phase.

According to a further embodiment of the optical arrangement, the phase element is formed by a diffractive optical element. This offers the advantage that the diffractive optical element can allow influence or adjustment of the phase with very high accuracy.

According to a further embodiment of the optical arrangement, the phase element comprises a plate, wherein different optical paths that are imaged in a superimposed manner pass through a different optical path length, influenced by the plate. This offers the advantage that a difference of the phases of the different optical paths can be obtained by the different optical path lengths. This allows placing the light contributions of the different optical paths of the different phases in the complex plane.

According to a further embodiment of the optical arrangement, the phase element comprises a plate having areas of different thicknesses. Here, different optical paths that are imaged in a superimposed manner pass through different optical path lengths, influenced by the different thicknesses of the plate. This offers the advantage that the light contributions can also be placed in a complex plane wherein the different thicknesses of the areas of the plate can be easily produced by manufacturing technology.

According to a further embodiment of the optical arrangement, the phase elements comprises a plate with areas having different indices of refraction. Here, different optical paths that are imaged in a superimposed manner pass through a different optical path length, influenced by the different indices of refraction of the plate. This offers the advantage that this configuration also allows placing the light contributions according to amount and phase in the optical plane.

According to a further embodiment of the optical arrangement, the phase element is configured to allow time-variant influence of the phase. This can also be expressed such that the phase element is not static. This offers the advantage that when changing the accuracy to be obtained or when changing a used light wavelength, adaptation of the phase element to the new requirements is possible.

According to a further embodiment of the optical arrangement, the phase element is programmable. This can also be expressed such that the phase element is adjustable. This offers the advantage that changing the phase change of the areas is also possible during operation, depending on the requirements.

According to a further embodiment of the optical arrangement, the phase element is a liquid-crystal phase modulator. This offers the advantage that the phase element can be configured in a time-variant manner and its characteristics can also be influenced during operation.

According to a further embodiment of the optical arrangement, a change of the adjustment of the amplitude by the spatial light modulator is by a factor of 2 or significantly faster than the change of influence of the phase by the phase element. This offers the advantage that a tradeoff in image repetition rate is not necessarily forced in this realization, since fast modular technology can be used due to the primary SLM (spatial light modulator). Here, again, a characteristic should be stated that has already been mentioned above. Here, a static (or quasi-static) phase element can be used, such that, at a constant light wavelength, phase influence is performed merely by controlling or switching different areas of the spatial light modulator and that the adjustment of the phase element is only changed when the light wavelength is changed. It would also be possible to change the adjustment of the phase element when it is known that the phase of an (overall) light of a complex modulation cell only has to cover a specific limited angular range during a longer time period. Thereby, for example, the accuracy of the phase can be improved.

According to a further embodiment of the optical arrangement, the spatial light modulator and the phase element and the optical system are arranged along a continuous optical axis. This offers the advantage that a more precise imaging can be obtained by a continuous optical axis and the optical arrangement can also serve as basic structure for several discrete wavelengths.

According to a further embodiment of the optical arrangement, the phase element is provided at a distance of a maximum of 2 mm from the spatial light modulator. According to that, the phase element is to be provided at a location where a light contribution can be allocated to an area of the spatial light modulator. In other words, an allocation of areas of the spatial light modulator to areas of the phase element is to be performed such that different areas of the spatial light modulator are allocated to areas of the phase element with different phase shifts (phase influences).

According to a further embodiment of the optical arrangement, the phase element is provided in an optically conjugated plane of the spatial light modulator with a low tolerance of ±5 mm. This offers the advantage that calibration and hence practical realization can be simplified due to a structure of the phase element spatially separate from the spatial light modulator.

According to a further embodiment of the optical arrangement, the optical system comprises a fading aperture that allows the superimposed light contribution to pass at a location of possible zero-order diffraction. This offers the advantage that the position of zero-order diffraction in the focus plane does not depend on the wavelength or the light wavelength, and thus usage of several light wavelengths or a light source with a basic structure is possible.

According to a further embodiment of the optical arrangement, the fading aperture only allows zero-order diffraction of the superimposed light contributions to pass through or the fading aperture only allows the superimposed light contributions to pass through at a location of possible zero-order diffraction. This offers the advantage that the imaging quality is improved in contrary to imaging including higher orders of diffraction.

According to a further embodiment of the optical arrangement, at least one area of the spatial light modulator is within an optical path, wherein this optical path is configured to contribute to a superposition. Further, the phase element is provided in this optical path between the spatial light modulator and the area of superposition. Here, the phase element is configured such that the phase of the light contribution of the stated optical path comprises a specific phase in the area of the superposition. This offers the advantage that superposition in the area can be configured such that different optical paths have a fixed phase allocation to one another.

According to a further embodiment of the optical arrangement, at least two areas of the spatial light modulator are configured to modulate several different optical paths, wherein the optical paths are each configured to contribute to a superposition. Further, the phase element is configured to change the phase of the light contributions that propagate along the several different optical paths to a different extent. This offers the advantage that the different optical paths result in a sum light strength in a superposition, which comprises an amplitude and a phase that can be adjusted by modulation by the spatial light modulator and by modulation by the phase element.

According to a further embodiment of the optical arrangement, at least two areas of the spatial light modulator are configured to modulate two different optical paths, wherein the optical paths are each configured to contribute to a superposition. Further, the phase element is configured to adjust a difference of the phase change of the light contributions that propagate along the two different distinguished optical paths, for example from 90°±10°.

This offers the advantage that the number of needed cells of the spatial light modulator can be reduced. Here, a reduction by 50% can be obtained, for example in the case of analog tilting mirror spatial light modulators.

According to a further embodiment of the optical arrangement, an area of the spatial light modulator is allocated to several areas of the phase element. This offers the advantage that the resolution can also be increased. Here, the modulation is allocated to several phase changing areas of the phase element by an area of the spatial light modulator.

According to a further embodiment of the optical arrangement, four areas of the phase element with different phase influence form the complex modulation cell with two areas of the spatial light modulator that are configured to modulate at least two distinguished optical paths. This offers the advantage that amplitude and phase can be adjusted within a complex modulation cell with the help of two areas of the spatial light modulator and four areas of the phase element. Thereby, it is possible to place the sum light in the complex plane with a small number of different areas of the spatial light modulator.

According to a further embodiment of the optical arrangement, several areas of the phase element that form a complex modulation cell with several areas of the spatial light modulator comprise at least three areas with different phase influence. Here, a difference between an angle of a first influence of a first area of several areas of a phase element and an angle of a second influence of a second area of several areas of the phase element is, for example, less than 180°. Further, the optical system is configured to enable superposition of the optical paths belonging to the complex modulation cell. This offers the advantage that with this arrangement a number of areas of the spatial light modulator and the phase element, which is as small as possible, can form a complex modulation cell. Here, it should be noted that no angle of a third phase influence lies between the angle of the first phase influence of the first area and the angle of the second phase influence of the second area.

According to a further embodiment of the optical arrangement, several areas of the phase element that form a complex modulation cell with several areas of the spatial light modulator comprise exactly n areas with different phase influence. Further, a difference between an angle of a first phase influence and an angle of a second phase influence is equal to 360°/n with a tolerance of ±360°/(2n). This offers the advantage that a number of areas of the phase element, which is as low as possible, can obtain an accuracy of the phase that is as high as possible.

In a further embodiment of the optical arrangement, the phase element is provided in a mechanically exchangeable manner. This offers the advantage that a phase element or several phase elements can be adapted for different light wavelengths, which can be used depending on needed light wavelengths.

In a further embodiment of the optical arrangement, the spatial light modulator and the phase element form a plurality of complex modulation cells. Here, the optical system is configured to image the plurality of complex modulation cells separately. This offers the advantage that a number of, for example, image points that correspond, for example, to the imaging of a complex modulation cell, can be imaged.

In a further embodiment, the optical arrangement comprises a tilting mirror, wherein the phase element is arranged such that two areas of the tilting mirror moving in opposite directions during deflection of the tilting mirror with respect to an optical axis due to mechanical coupling are allocated to two areas of the phase element providing different phase contributions.

In a further embodiment, the tilting mirror is configured to generate a phase contribution that is variable in a direction perpendicular to the optical axis, wherein the phase element is configured to provide a first phase contribution in a first area of the tilting mirror and to provide a second phase contribution in a second area of the tilting mirror. The phase contribution of the tilting mirror is either locally constant or locally linearly variable across the first and second areas.

In a further embodiment, the phase element is configured to realize a non-continuous phase curve by using a tilting mirror providing a locally constant phase contribution depending on a deflection of the tilting mirror.

In a further embodiment, the phase element is arranged such that the phase element allocates a phase jump of at least 90° to two areas of a tilting mirror providing a locally constant phase contribution depending on a deflection of the tilting mirror.

A further embodiment provides a method for operating an optical arrangement with a spatial light modulator and a phase element for generating a complex-valued light field, wherein the method comprises adapting an optical characteristic in several areas of a phase element in dependence on a useful light wavelength of light contributions to be modulated in order to realize that a phase influence in a respective area of the phase element varies across an area of useful light wavelengths by at most 180°. This offers the advantage that light of different light wavelengths can be adjusted in amount and phase.

A further embodiment provides a method for operating an optical arrangement with the spatial light modulator and a phase element for modulating different light wavelengths. Here, the method comprises adjusting several phase influences in several areas of a phase element belonging to a complex modulation cell in dependence on a light wavelength of the light contributions modulated by a complex modulation cell in order to keep a phase influence realized in respective areas of the phase element constant across a predetermined area of useful light wavelengths with a tolerance of at most 180°. This offers the advantage that light of different light wavelengths can be adjusted in amount and phase.

A further embodiment provides a method for operating an optical arrangement with a spatial light modulator, a phase element and an optical system for generating light field distributions that are spatially adjustable with varying amplitude and phase by adjusting a spatial light modulator to modulate light intensities in at least two optical paths that pass through areas of the spatial light modulators that are imaged in a superimposed manner and in which phase modulations are performed to a different extent. Here, in a first adjustment state, a first distribution of the light intensities exists in the at least two optical paths and light of a first phase position is obtained and in a second adjustment state, a second distribution of light intensities exists in the at least two optical paths that differs from the first distribution of the light intensities and thereby light is obtained in a second phase position.

BRIEF DESCRIPTION OF THE DRAWINGS

Embodiments of the present invention will be detailed subsequently referring to the appended drawings, in which:

FIG. 3b is an illustration of phase contributions along the light path in the optical arrangement according to FIG. 3a;

FIG. 3c is an illustration of a phase element according to a further embodiment in a sectional view and plane view;

FIG. 7 is a flow diagram of a method according to an embodiment of the present invention;

DETAILED DESCRIPTION OF THE INVENTION

In the following, different possible embodiments according to the present invention will be discussed, which can realize, for example, the invention of a phase and amplitude spatial light modulator arrangement.

Figure 1:
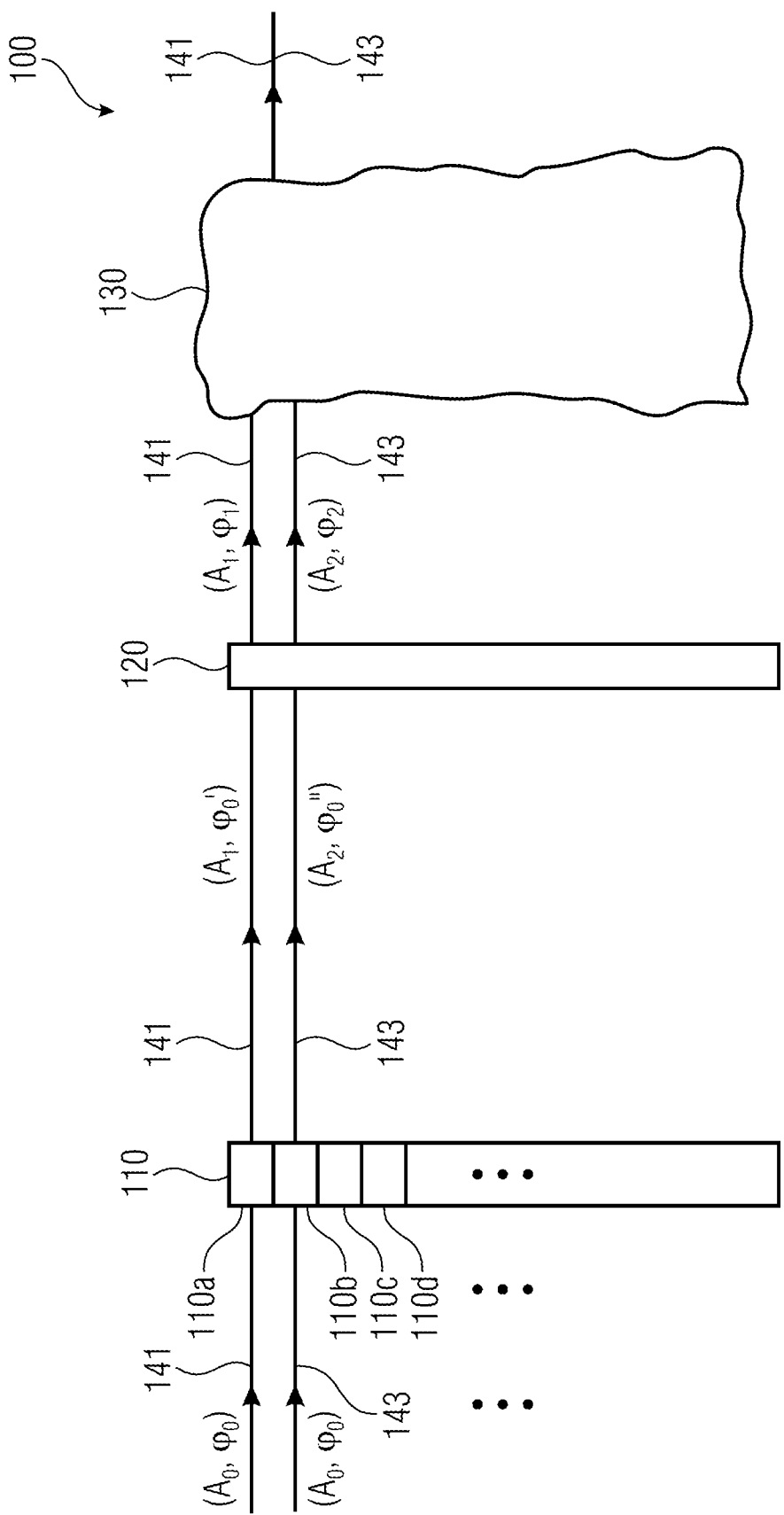
FIG. 1 is a schematic illustration of an optical arrangement according to a first embodiment of the present invention.

Embodiment According to FIG. 1

FIG. 1 shows an optical arrangement 100. The optical arrangement 100 includes a spatial light modulator 110, a phase element (phase modulator) 120 and an optical system 130. Further, FIG. 1 shows a first optical path 141 and a second optical path 143. When light with sufficient coherence length is assumed, light contributions having an amplitude and a phase are propagating along these different optical paths. Further, the spatial light modulator 110 (which can be a phase spatial light modulator or a spatial light modulator with coupled amplitude and phase characteristic curve) comprises several areas 110a, 110b, 110c. In FIG. 1, the two areas 110a, 110b are illustrated such that the two areas 110a, 110b can influence an amplitude of the light contributions of the respective optical path 141, 143. The spatial light modulator 110 or the areas 110a, 110b, 110c can be configured to adjust a respective amplitude of a plurality of light contributions propagating along a plurality of optical paths 141, 143. The phase element 120 can be configured to influence respective phases of the plurality of light contributions such that the phase of at least two light contributions propagating along different optical paths 141, 143 are varied to a different extent. Thus, the light contributions can be aligned according to their phase in a respective optical path in the complex plane. Further, the optical system 130 can be configured to image several areas 110a, 110b, 110c . . . of the spatial light modulator 110 in a superimposed manner. Here, the areas 110a, 110b of the spatial light modulator 110, which are, for example, superimposed lie in different optical paths 141, 143, wherein the light contributions propagating along these different optical paths 141, 143 comprise phases that are varied to a different extent by the phase element 120. This can also be expressed such that the (optically) superimposed areas of the spatial light modulator 110 lie in different optical paths 141, 143, whose phases are varied by the phase element 120 to a different extent.

Further, FIG. 1 indicates that by superposition by the optical system 130, the optical paths 141, 143 are superimposed such that the optical paths (or the allocated image points of the spatial light modulator) are illustrated or imaged in a manner where the same can no longer be differentiated. Further, by an exemplary statement of amplitudes and phase of the respective optical paths, a possible mode of operation of the optical arrangement 100 is illustrated. The amplitude and the phase of the two optical paths 141, 143 before an influence by the phase and phase-amplitude spatial light modulator 110, respectively, are indicated by $A_0$ for the amplitude and $\varphi_0$ for the phase. In this example, the case is selected that the light to be modulated has an identical phase and identical amplitude in the two optical paths 141, 143. Due to the influence by the phase and phase-amplitude spatial light modulator 110, respectively, or due to the influence by the areas 110a, 110b, the respective amplitude of the light contributions of the two optical paths 141, 143 changes. After the influence by the area 110a, the optical path 141 has an amplitude $A_1$ and phase $\Phi_0$. This is to characterize that the amplitude $A_1$ of the optical path 141 after influence by the area 110a can generally differ from the amplitude $A_0$ of the optical path 141 before the influence by the area 110a. The same can also be stated for the optical path 143. For the light contribution propagating along the optical path 143, the amplitude before an influence by the area 110b is indicated by $A_0$, after the influence by the area 110b by $A_2$. The different designation of the amplitude does not mean that $A_0$ has to differ from $A_0$ or $A_2$ from $A_0$, but the spatial light modulator 110 advantageously provides this option. Further, a phase $\varphi_0''$ results in the optical path 143, wherein compared to the phase $\varphi_0$, the phase $\varphi_0''$ can be adjusted by the phase spatial light modulator and the combined amplitude phase spatial light modulator, respectively, (such that a variable phase offset is obtained between $\varphi_0'$ and $\varphi_0''$).

The phase element 120 obtains (further) adjustment (variation, influence) of the phases of the two optical paths. Before an influence by the phase element 120, the light contribution(s) propagating along the optical path 141 have a phase $\varphi_0$ (or another fixed phase relation to one another), after the influence by the phase element 120, the light contributions propagating along the optical path 141 have a phase $\varphi_1$. In the second optical path 143, a phase prior to an influence by the phase element 120 is $\varphi_0$. After an influence by the phase element 120, the phase of the light contributions propagating along the optical path 143 is $\varphi_2$. In this case, a differing phase $\varphi_1$, $\varphi_2$ is a useful configuration. Thereby, it is possible to place the vectors in a complex plane with the help of the different phases, wherein the vectors of the light contributions have an amplitude $A_1$, $A_2$ and a respective phase $\varphi_1$, $\varphi_2$.

Further, the optical system 130 can be configured to superimpose the optical paths 141, 143 or to image them in a superimposed manner (for example such that the optical paths 141, 143 end in a common image point or such that different sub-image points of the spatial light modulator are imaged to a common image point). For illustration purposes, this is illustrated in FIG. 1 such that the optical paths 141, 143 are illustrated as one optical path after passing through the optical system 130. By this superposition of the optical paths, superposition of the waves can be performed by considering the amplitudes and the phases. This can correspond, for example, to a vector addition of the "vectors" of the light contributions propagating along the two optical paths 141, 143.

Here, the optical system 130 can be configured such that not only two optical paths, in this case defined as optical paths 141 and 144, but a plurality of optical paths are imaged in a superimposed manner. Also, superposition of several optical paths that are influenced by adjacent areas of the spatial light modulator 110 is possible by the optical system.

Thus, the optical system 130 can also be configured such that the optical system 130 superimposes several areas or several adjacent areas of the spatial light modulator 110 to a complex modulation cell or images them in a superimposed manner. A complex modulation cell can mean that the light contributions can be adjusted according to amount and phase by the phase element 120 adjusting a phase differently and by an amplitude modulation by the spatial light modulator 110. Thus, by superimposing the different light contributions of different amplitudes and different phases, a sum light can result that represents a vector in the complex plane, wherein the vector of the sum light can differ from the vectors of which the same is composed. Alternatively, the spatial light modulator can perform controlled selection of one of the light contributions wherein different light contributions and different optical paths 141, 143, respectively, can be selected in a complex modulation cell at different times.

Further, the optical system 130 can comprise an optical low-pass filter. This low-pass filter can be configured to superimpose several optical paths such that several areas or several adjacent areas of the spatial light modulator 110 are superimposed to a complex modulation cell. In this case, a sum light that can also be composed of the light contributions of the different optical paths can have an amplitude and phase that differs from the amplitudes and the phases of the individual light contributions.

A useful optical path considering no scattering and diffraction and other unwanted ("parasitic") effects, i. e. some sort of functional optical path, can be an optical path passing first across the spatial light modulator 110, followed by the phase element 120 and further across the optical system 130. This optical path is illustrated accordingly in FIG. 1. On the other hand, it is also possible that the optical path first passes through the phase element 120 and only after that through the spatial light modulator 110. It can also be the case that the same passes through elements of the optical system 130 before the two modulators 110 and 120 or between the two modulators 110, 120. However, one condition is that the superposition of the optical paths belonging to a complex modulation cell only takes place after passing through the spatial light modulator 110 and the phase element 120.

The method described herein uses, for example, zero-order diffraction of a pattern written into the SLM (spatial light modulator 110). The position of the zero-order diffraction in the focus plane does not depend on the wavelength. Thus, the method described herein can be used, for example, monochromatically, also sequentially or spatially parallel for several wavelengths and possibly for spectral broadband sources with filter. In contrary to [3], the presented method comprises no method-inherent chromatic aberrations.

The optical axis of the system is maintained. The presented method significantly simplifies the optical system design in that the same allows the intended use of corrected optical devices (for example in the form of the optical system 130 or parts of the optical system 130) and the same time makes the same useable for several purposes (wavelengths) in parallel.

Compared to the existing method according to [3], the light efficiency is improved when using zero-order diffraction. A larger percentage of the light reaches the system output from the (for example laser) light source.

The method for complex modulation can be used, for example with phase spatial light modulators and phase-amplitude spatial light modulators such as digital micromirror arrangements or analog tilting mirror matrices.

In summary, it can be said that FIG. 1 shows an optical arrangement (100) for generating light field distributions that can be adjusted (for example spatially and/or temporally) with varying amplitude and phase. The optical arrangement includes the programmable spatial light modulator (110), the phase element (120) and an optical system (130). The phase element is configured to effect at least two or more phase contributions on adjacent modulator pixels (for example on "sub-pixels" or "sub-image points" that are controlled by adjacent areas of the spatial light modulator or that are allocated to adjacent areas of the spatial light modulator). The optical system (130) is configured to image several areas (110a; 110b; 110c) of the spatial light modulator (110; 210; 310; 410), for example areas of the spatial light modulator that experience different phase contributions by the phase element, in a superimposed manner. The spatial light modulator and the phase element are arranged within a depth of field of a plane or conjugated optical mask planes. Thus, the optical arrangement is configured, for example, to obtain a predeterminable complex light field distribution in a subsequent image plane (for example an image plane following the optical system).

Further, the phase element can be replaced by a polarization element. The polarization element can be configured to effect at least two or more polarization contributions on adjacent modulator pixels or to apply at least two different polarization filters to adjacent modulator pixels. Thus, polarization of light can be obtained by superposing light contributions can be adjusted.

Further, the usage of a polarization element can be combined with the usage of a phase element such that, for example, amplitude, phase and polarization can be adjusted. By allocating, for example, different polarization elements having a stationary or only slowly variable polarization behavior to an image point, fast control of the polarization characteristics by the spatial light modulator is possible (for example in that different sub-pixels or sub-image points of the spatial light modulators that are imaged onto an image point in a superimposed manner determine how much light intensity impinges on which of the individual polarization elements or how large or how intense light contributions from the individual polarization elements are).

Figure 2:
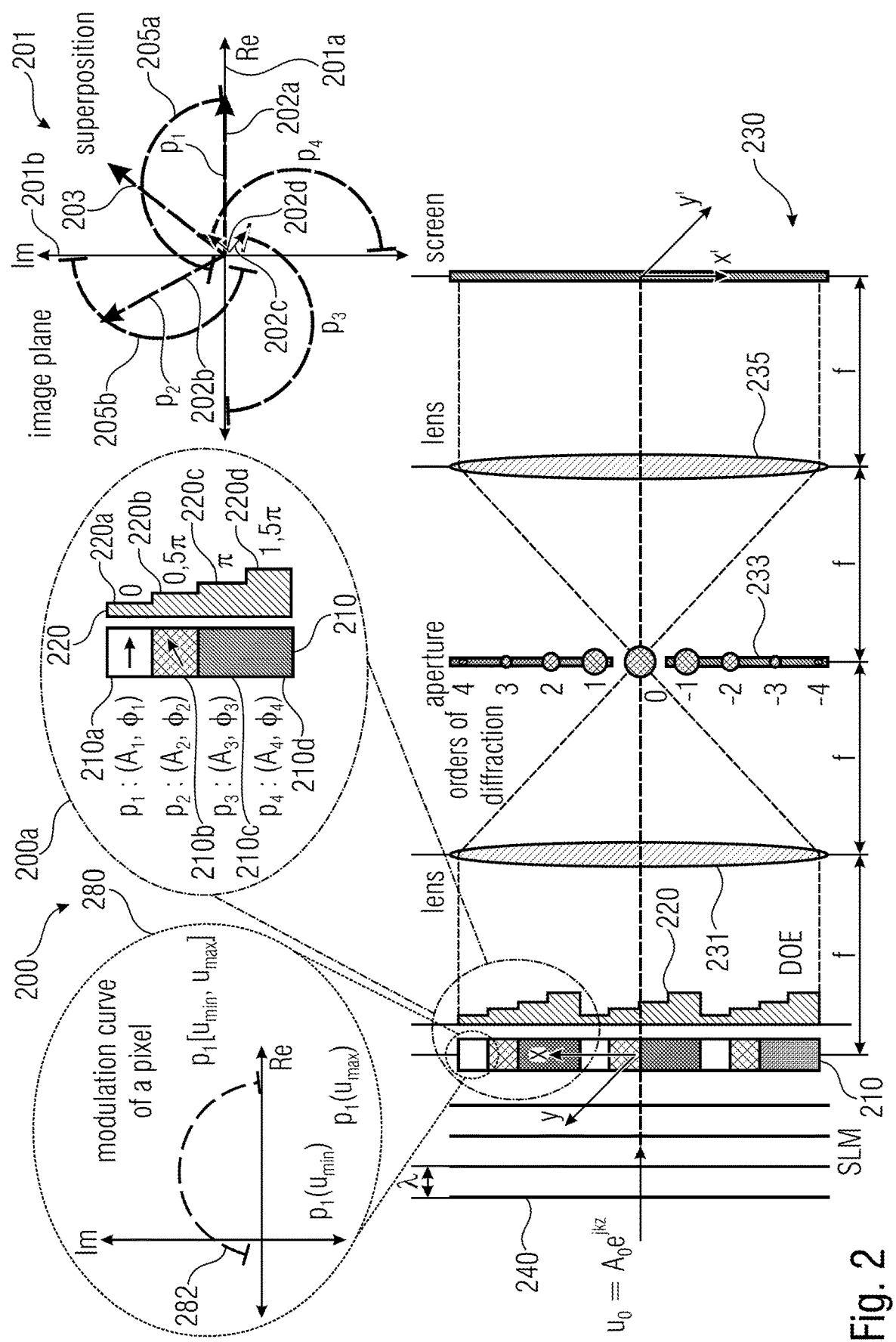
FIG. 2 is a schematic illustration of an optical arrangement and an illustration of a complex plane with a sum light vector according to an embodiment.

Embodiment According to FIG. 2

FIG. 2 shows an embodiment of an optical arrangement 200. Further, FIG. 2 shows a detailed view 200a of the spatial light modulator 210 and the phase element 220. Further, FIG. 2 shows an illustration 201 of a complex plane having different vectors. These different vectors 202a, 202b represent vectors representing amplitude and phase of light waves with possible amplitudes and phases that can be adjusted with the help of the phase element 220. A further vector 203 shows a possible sum vector 203 corresponding, in amount and phase, to a possible sum light (or represents a wave of the sum light), wherein a vector representing the sum light is composed of vectors 202a, 202b (or individual ones of the vectors) and formed by vector addition of vectors 202a, 202b, respectively. The sum light results by superposing different light contributions that are influenced (modulated) by different areas 210a, 210b, 210c, 210d of the spatial light modulator 210.

Here, the optical arrangement 200 comprises the above-mentioned spatial light modulator 210. The spatial light modulator 210 can be controlled, for example, such that light contributions reflected, remitted, transmitted or emitted by the same have a phase relation to one another that is variable by control, at least at a constant light wavelength, wherein the control of the spatial light modulator can change both an amplitude contribution of the respective area as well as a phase contribution of the respective area. The change of amplitude contribution and phase contribution can, for example, be coupled, such as shown at reference number 280.

In particular, a locus is shown at reference number 280, which indicates how amplitude contribution and phase contribution of an area of the spatial light modulator can change with a variation of a control voltage (or a different control signal). For example, an amplitude and phase contribution of an area of the spatial light modulator (commonly illustrated by a point in a complex plane) can pass through a locus 282 that starts at a point p1(umin) and ends at a point p1(umax). For example, both amplitude and phase vary along the locus, wherein a phase change along the locus is, for example, less than 180 degrees and wherein amplitude and phase can only be adjusted together. This can be the case, for example, for a liquid-crystal spatial light modulator.

This excitation or irradiation or control is illustrated in FIG. 2 by the planar wavefront 240. This planar wavefront 240 shows a wavelength X and a propagation direction in z direction. Here, the planar wavefront 240 is described in complex (pointer) form as $A_0 e^{jkz}$. This planar wavefront 240 can also represent a possible excitation or irradiation or control of the spatial light modulator 210 (SLM) (for example during emission). The phase element 220 is disposed adjacent to this spatial light modulator 210 at a small distance. In the selected case, this phase element 220 is characterized as DOE (diffractive optical element). In the detailed view 200a, parts of the spatial light modulator 210 and the phase element 220 are illustrated again. Here, the spatial light modulator 210 comprises different areas 210a, 210b, 210c and 210d. These different areas can also be numbered as image points or pixels or sub-image point or sub-pixels ($p_1$, $p_2$, $p_3$, $p_4$). The areas 210a-201d can also be considered as "sub-pixels" and all of them together can be imaged in a superimposed manner on a single image point of an image. Different areas of the phase element 220 are allocated to these areas 210a to 210d. Thus, the phase element 220 comprises areas corresponding (allocated) to the four areas 210a, 210b, 210c and 210d of the spatial light modulator 210. In the phase element 220, a change of phase is indicated, wherein the area 220a of the phase element 220 corresponding to the area 210a or allocated to the area 210a has a first phase change of, for example, 0 (wherein the phase contribution of the first area can be determined arbitrarily and wherein merely the differences of the phase contributions of the areas 220a, 220b, 220c, 220d matter). The area 220b of the phase element 220 allocated to the area 210b comprises a second phase change of, e. g. 0.5 π, the area 220c of the phase element 220 allocated to the area 210c comprises a third phase change of, e. g. π and the area 220d of the phase element 220 allocated to the area 210d comprises a fourth phase change of, e. g. 1.5 π.

Further, the optical arrangement 200 comprises an optical system 230. In the illustrated case, the optical system 230 comprises a first lens 231, an aperture 233 and a second lens 235. In that case, the aperture 233 can represent a fading aperture that is configured to allow zero-order diffraction of the superimposed light contribution to pass through or a fading aperture which only allows zero-order diffraction of the superimposed light contributions to pass through. Further, the aperture 233 can also correspond to a low-pass aperture, wherein in this case the aperture 233 is configured to superimpose several areas or several adjacent areas, for example areas 210a, 210b, 210c, 210d of the spatial light modulator 210 to a complex modulation cell.

Further, FIG. 2 comprises a screen which is not part of the optical arrangement 200. For example, the complex-valued (i. e. adjusted in amount and phase) spatial light can be projected onto this screen.

Further, FIG. 2 shows a representation 201 representing a position of vectors of different light contributions resulting in an image plane in a complex plane. Here, the representation 201 comprises an abscissa 201a corresponding to a real part axis and further comprises an ordinate 201b corresponding to an imaginary part axis. Further, the representation comprises the two vectors corresponding to the two pixels $p_1$ and $p_2$. One pixel $p_1$ and the light contribution of a pixel pi, respectively, is represented by a vector 202a. In the selected example, this vector 202a is within the real part axis but when the first image point or sub-image point 210a is controlled accordingly (i. e. by changing a control signal) the same can be varied along a locus 205a. The vector 202b corresponds to a light contribution of pixel $p_2$. By changing a control voltage of the second sub-image point, the vector 202b can be varied along a locus 205b. Here, it is obvious that the locus 205*b* is rotated by 90 degrees with respect to the locus 205*a*. When equal spatial light modulator sub-image points are assumed, this is obtained by the phase difference between the first area 220*a* of the phase element and the second area 220*b* of the phase element. Accordingly, it can be seen in the enlarged representation of the optical arrangement 200*a* that a phase offset in the phase element 220 of 0.5 π is allocated to the pixel p$_2$ and the area 210*b*, respectively. The vector 202*c* corresponding to a light contribution of the pixel p$_3$ is comparatively short. The locus 205*c* of the third sub-image point is rotated by 180 degrees (compared to the locus of the first sub-image point) which is induced by the phase offset of π in the area 220*c* of the phase element allocated to the pixel p$_3$ and the area 210*c*, respectively, of the spatial light modulator. In the representation 201, a fourth vector 202*d* is illustrated which corresponds to a contribution of the pixel p$_4$. The locus of the fourth sub-image point is rotated by 270° with respect to the locus of the first sub-image point, which is induced by the phase offset of 3 π/2 in the area 220*d* of the phase element, wherein this phase offset of 1.5 π is allocated to the area 210*d* and the pixel p$_4$, respectively, of the spatial light modulator 210.

In the enlarged representation 200*a* of the optical arrangement 200, it can be seen that the area 210*a* corresponding to pixel p$_1$ is white, which corresponds to a first control voltage. The area 210*b* corresponding to a pixel p$_2$ is medium grey (or a respective shading) which corresponds to a second control voltage. The further pixel p$_3$, i. e. the area 210*c* and the pixel p$_4$, i. e. the area 210*d* are black, which corresponds to a third control voltage.

In the shown example, this can be considered as a value of transmissivity and also of a phase contribution of the spatial light modulator 210. This means that the areas 210*c* and 210*d* have a low transmissivity or completely (at least almost) absorb incident light. The area 210*a* has a very high transmissivity that can correspond, for example, to a transmissivity of 100% (or almost 100%). The transmissivity of the area 210*b* is shown in medium grey and can correspond, for example, to a transmissivity of 50% (or in a range between 50% and 80%). In the representation 201, this is shown again. The vector 203 can be seen as vector addition of a contribution of the pixel p$_1$ with full amplitude and a contribution of the pixel p$_2$ with half the amplitude. Smaller contributions can also originate from the third pixel (or sub-image point) and from the fourth pixel (or sub-image point).

FIG. 2 further shows the phase element 220, in this case indicated by DOE. Thus, the phase element 220 can correspond to a diffractive optical element. This phase element 220 can comprise a time-invariant influence of the phase which can alternatively be expressed such that the phase element 220 is static. In the embodiment according to FIG. 2, it is further illustrated that this phase element 220 comprises a plate, wherein different optical paths that are to be imaged in a superimposed manner pass through a different optical path length, influenced by the plate of the phase element 220. Due to his different optical path length, a difference of the phase of the different optical paths can be obtained. This is, for example, illustrated in the enlargement 200*a* such that the (relative) phase changes (or phase contributions) are shown by 0, 0,5π, π and 1,5π according to different thicknesses of the plate. In that way, the phase element can obtain a different optical path length in that the optical paths pass through different thicknesses of the plate. An alternative embodiment would, for example, be a combination of areas with different indices of refraction. Here, the plate could, for example, be produced in a planar manner. Further, a combination of the two options is possible, i. e. a different mechanical thickness and a different index of refraction of the individual areas. All this obtains different optical path lengths of different optical paths passing through different areas of the phase element 220.

In FIG. 2 and in the representation of the optical arrangement 200, respectively, it is illustrated that the phase element 220 is composed of several individual portions. As shown in FIG. 2, these portions can be repeated. In the illustrated example, four different phase offsets are repeated, obviously a repetition after less than or after more than four areas of different phase offsets is also possible. FIG. 2 further shows an incident planar wave 240 indicated by $u_0 = A_0 e^{jkz}$. In the illustrated example, this planar wave 240 can be absorbed and at least almost completely absorbed, respectively, by the individual areas 210*a*, 210*b*, 210*c*, 210*d* of the spatial light modulator 210 (black areas or equivalent shading) or can be transmitted (white areas) or partly absorbed and partly transmitted, respectively (grey areas or equivalent shading).

Further, it can be seen that the distances between the area to be imaged, i. e. the plane of the spatial light modulator 210 and a first lens 231 of the optical system 230 corresponds to a focal length f of the lens. An aperture 233 is shown at a distance of the focal length f from the lens 231. On this aperture 233, different orders of diffraction are illustrated. These orders of diffraction show that the aperture 233 is configured such that only zero-order diffraction can pass. A second lens 235 is illustrated at a distance of a further focal length f. Finally, a screen is illustrated that is at a distance of a focal length f from the second lens 235. This optical system is configured such that the area 210 or the area of the spatial light modulator 210 can be imaged onto the screen.

A useful optical path considering no scattering and stray light and other undesired ("parasitic") effects, i. e. some type of functional optical path, can be an optical path passing first across the spatial light modulator 210, followed by the phase element 220 and further across the optical system 230. In the area of the optical system 203, the optical path first passes through the first lens 231, then the aperture 233 and finally the second lens 235. This is illustrated in FIG. 2 accordingly. On the other hand, it is possible that the optical path passes first through the phase element 220 and only then the spatial light modulator 210. It can also be the case that elements of the optical system 230 are passed through before the two modulators 210 and 220 or between the modulators 210, 210. However, one condition is that the superposition (here for example in the area of the aperture 235) of the optical paths belonging to a complex modulation cell is only performed after passing through the spatial light modulator 210 and the phase element 220.

FIG. 2 shows a complex modulation method using zero-order diffraction. A static phase element 220 (here DOE) places the complex-valued contributions of the SLM pixels (for example p$_1$, p$_2$, p$_3$, p$_4$) to the image in the output plane (screen). An aperture 233 provides for the superposition of the pixels. A complex macro pixel consists, for example, of the four programmable SLM pixels p$_1$, p$_2$, p$_3$, p$_4$ (also referred to as "sub-pixels" or sub-image points).

The presented method uses a system of a programmable spatial light modulator 210 and a further static phase element 220 (e. g. diffractive optical element DOE). FIG. 2 shows the principle. The pixels (or loci of the amplitude and phase amounts effected by the pixels) in a complex modulation cell are placed in the complex plane by means of phase delay, effected, for example, by the phase element 220 (for example such that the loci of the amplitude and phase contributions are rotated relative to another via an adjustment parameter). Here, the inventive method mainly uses zero-order diffraction of the field modulated by the SLM 210. All higher orders of diffraction are possibly excluded from the optical path by means of an aperture 233. Additionally, the aperture 233 provides for the superposition of adjacent pixels to a complex modulation cell (optical low-pass filtering). The position of zero-order diffraction does not depend on the wavelength. Thus, in the presented method, all components are arranged in a continuous optical axis for precise imaging which can at the same time serve as basic structure for several discrete wavelengths.

The method is suitable for complex-valued modulation of light. The same can be combined with a plurality of modulator technologies, among others also technologies with fast image repetition rates (e.g. microelectromechanical systems, MEMS). The method is particularly suitable for applications needing complex-valued modulation in connection with high image repetition rates. Additionally, a flexibly designed and at the same time precise system structure and usage of different wavelengths are the basic issues of the invention.

Possible applications are the technical treatment of stray light: Digital optical phase conjugation [6] and wavefront shaping [7]. These two comparatively young disciplines explore options of imaging by straying media and within these media. Numerous biological materials have strong scattering effects. The two stated methods allow focusing and imaging in deep tissue layers but entail fast and ideally complex light field modulation [8].

A further possible application is holographic 3D image representation by means of digital holography. For exact reconstruction of a three-dimensional light field, complex modulation is needed [9]. Currently, in this application, phase modulation is used and quality losses due to the lack of adjustability of the amplitude are accepted. The presented method can improve this optical imaging quality.

Further, according to the invention, for highest optical flexibility, it is advantageous to replace the static DOE 220 in the presented method by a programmable phase element (for example 120, 220, 320, 420), e.g. with slow modulation on liquid-crystal basis. In that way, for example, phase masks adapted to the wavelengths can be realized. At the same time, no tradeoff in the image repetition rate is needed in this realization since the primary amplitude-modulated SLM 210 (MEMS) and hence the spatial light modulator 210 can operate with fast modulator technology.

Further, it can be stated that the static modulator 220 can be arranged, for example, at a low distance to the programmable SLM. Similarly, the static modulator 220 can also be disposed in a conjugated optical plane (i. e. the phase element 420, see FIG. 4). This can simplify adjustment and hence practical realization.

In summary, it is to be noted that FIG. 2 shows a characteristic curve of a liquid-crystal element wherein amplitude and phase are adjusted in a coupled manner. The curve parameter in an enlarged representation at reference number 280 is the voltage applied to the element. In the representation at reference number 200a, a grey value represents an amplitude and an arrow a phase position of the individual pixels.

Figure 3A:
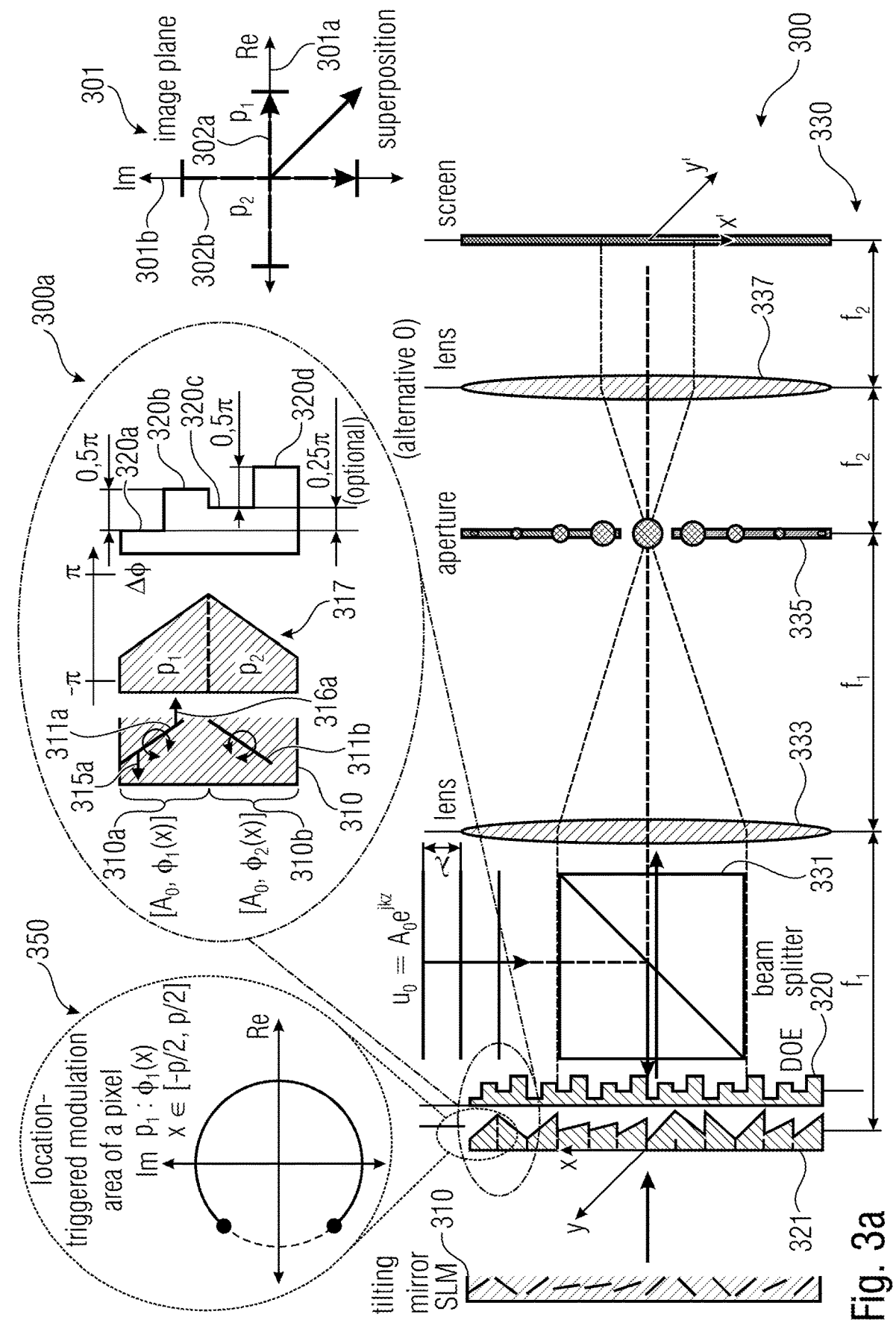
FIG. 3a is a schematic illustration of an optical arrangement with an analog tilting mirror arrangement and a diffractive optical element and an illustration of a complex plane according to an embodiment of the present invention.
Figure 3B:
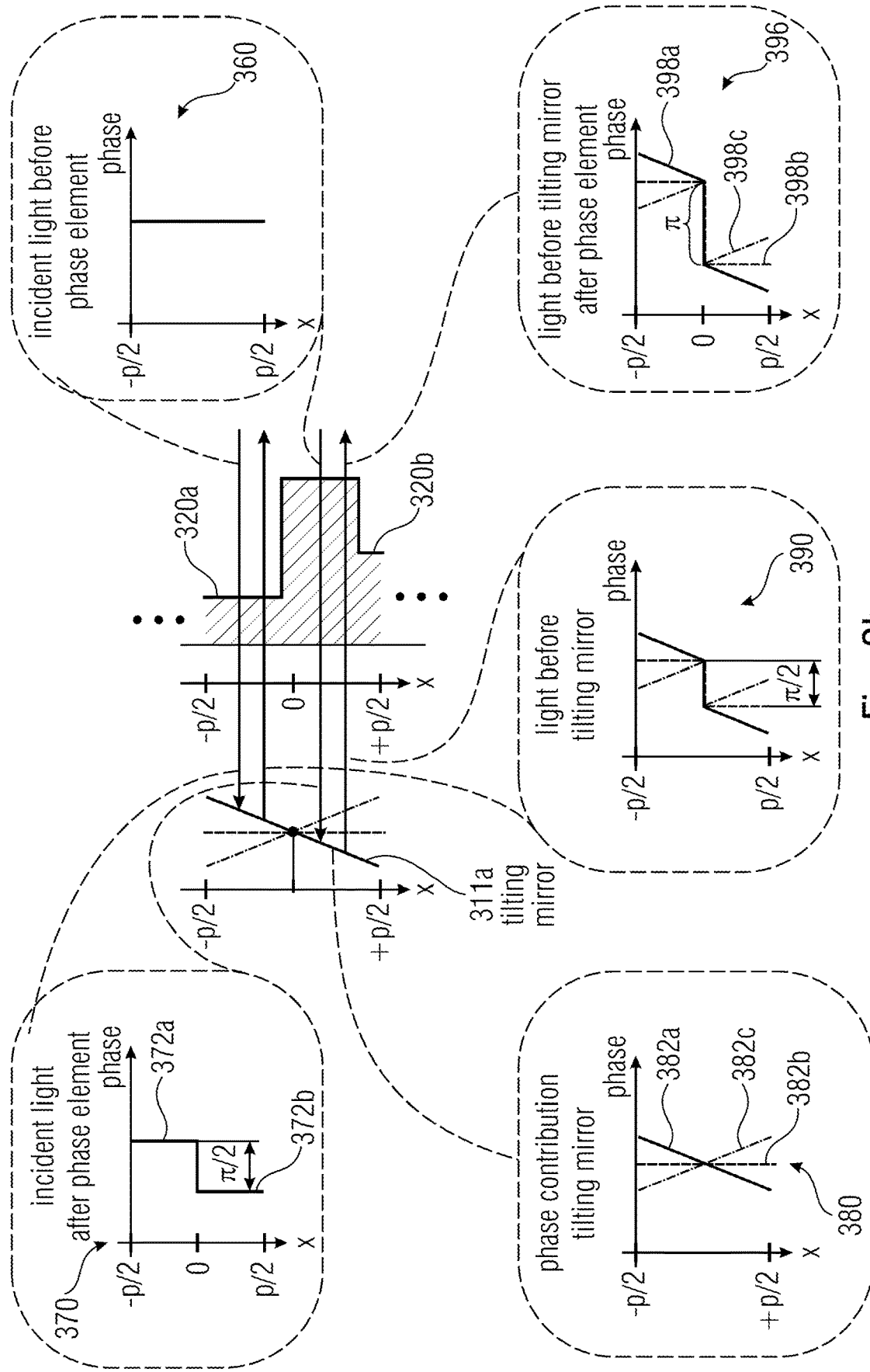

Embodiment According to FIGS. 3a and 3b

FIG. 3a illustrates an optical arrangement 300 with a tilting mirror arrangement 310. Further, a representation 301 of vectors of light contributions is illustrated.

Regarding the optical arrangement 300, a detailed view 300a is shown. The detailed view 300a shows part of the spatial light modulator 310 with two tilting mirrors and part of the phase element 320. The optical arrangement 300 comprises a spatial light modulator 310 and a phase element 320 which can be configured as diffractive optical element (DOE). Further, the optical arrangement 300 comprises an optical system 330. This optical system comprises a beam splitter 331, a first lens 333, an aperture 335 and a second lens 337.

In the illustrated case, the spatial light modulator 310 is produced by using an analog tilting mirror arrangement. Further, for example, systems would be possible that use microelectromechanical systems or digital micromirror arrangements (DMD, digital micromirror device) or also liquid-crystal arrangements.

The entire structure, i. e. the optical arrangement 300 can be described as follows. An incident light wave 340 indicated by $u_0 = A_0 \cdot e^{jkz}$, which can therefore be a planar light wave 340, impinges, for example, on a beam splitter from a direction that is essentially perpendicular to an optical axis. The beam splitter again reflects or deflects the incident light beam (or the incident planar (light) wave 340), among others in the direction of the phase element 320 and the spatial light modulator 310, such that the deflected incident wave propagates essentially in parallel to the optical axis of the arrangement. Then, the planar wave passes through the phase element 320 for the first time and experiences different phase contributions in different local areas. The planar wave provided with different phase contributions is reflected (remitted) by the spatial light modulator 310 in the different areas illustrated, for example, in the detailed view 300a or introduced into different optical paths. Here, the dimensions of an individual tilting mirror of the spatial light modulator are, for example, such that diffraction phenomenons matter. This reflected or diffracted wave experiences a further change of the phase in different areas of the phase element 320 during the second passage through the phase element 320. This phase-changed or phase-modulated (and optionally amplitude-modulated) wave passes through the beam splitter 331 and the first lens 333. The first lens 333 with a focal length $f_1$ focuses the light field in an aperture 335. This aperture 335 can again be considered as fading aperture which allows only zero-order diffraction of the modulated light field to pass through. Further, the aperture 335 can also be configured as optical low-pass filter, wherein this optical low-pass filter is configured to superimpose several areas or several adjacent areas 310a, 310b of the spatial light modulator 310 to a complex modulation cell. The second lens 337 is at a distance of a focal length $f_2$ (i. e. the focal length of the second lens 337) from the aperture 335 is. This second lens 337 can be configured to image the light field on a screen that is provided at a distance $f_2$ from the second lens 337 in FIG. 3a.

Further, in FIG. 3a, a detailed view 300a is illustrated. This detailed view 300a shows a portion (for example with two tilting mirrors) of the spatial light modulator 310 and a portion of the phase element 320. The spatial light modulator 310 comprises two areas 310a and 310b. These two areas 310a and 310b correspond to the pixels or sub-image points $p_1$ and $p_2$. These areas comprise one tilting mirror each (i. e. two all in all) that are suitable to reflect a light field in an optical path or to modulate the same in an optical path. For example, a single tilting mirror can effect a location-dependent (variable across the extension of the tilting mirror) phase modulation of the light field, wherein an extent of the phase modulation can be adjusted, for example, by the deflection of the tilting mirror. For example, the first tilting mirror arranged in the area 310a can effect a first spatial phase modulation of the light field. The second tilting mirror arranged in the area 310b can effect a second spatial phase modulation of the light field. Two areas of the phase element 320, an area 320a and an area 320b are allocated to the area 310a, i. e. the pixel or sub-image point $p_1$ or a first tilting mirror. In the shown example, the areas 320a, 320b of the phase element 320 are shown with different thicknesses, wherein again a phase offset (between light waves passing through the first area 320a and light waves passing through the second area 320b) can be adjusted by these areas 320a, 320b of differing thickness. The phase difference between the two areas 320a and 320b is indicated by $\pi/2$ (for a single passage) which corresponds to a phase jump of 90° or a field phase-shifted by 90°. Thus, the spatial light modulator 310 or, for example, the first area 310a or the first tilting mirror can be used such that the same is suitable to modulate or to adjust an optical path, wherein the same is influenced by the areas 320a, 320b of the phase element 320. Analogously, the area 310b of the spatial light modulator 310 or the second tilting mirror can be used. This area 310b can correspond to a pixel or image point $p_2$. Again, two areas 320c, 320d of the phase element 320 are allocated to this area 310b and the second tilting mirror, respectively. The difference of the phase changes between the two areas 320c, 320d corresponds again (for a single passage of a wave) to 90 degrees or $\pi/2$. Thus, it is possible to generate light fields that are each phase-shifted by 90 degrees by the two areas 310a, 310b (as well as to provide a phase contribution of 180 degrees for passing through twice). Again, a phase offset is provided between the areas 320a, 320b and the areas 320c, 320d. The same is indicated by 0.25 $\pi$. Thereby it is possible to adjust phase contributions, such that the phase contributions in the first area and in the second area have a phase difference of 90 degree for passing twice through the phase element.

A single tilting mirror, which can correspond, for example, to an area 310a, 310b or other areas of the spatial light modulator 310 obtains a location-dependent phase contribution. Here, such a tilting mirror 311a, 311b has the option of rotating (tilting, tipping) the tilting mirror 311a, 311b around an axis. Further, it should be noted that the tilting mirrors and the phase element are arranged or configured such that two areas of the tilting mirror that move in opposite directions with respect to an optical axis due to mechanical coupling when deflecting the tilting mirror are allocated to two areas of the phase element providing different phase contributions. In that way, the tilting mirror can be configured, for example, according to a seesaw such that opposite sides of a continuous structure are deflected in opposite directions, for example seen in the direction of the optical axis. This is indicated accordingly by arrows 315a, 316a in the detailed view.

Further, FIG. 3a shows a representation 301 describing a complex plane of a light field. Here, the illustration 301 comprises an abscissa 301a corresponding to a real part axis and an ordinate 301b corresponding to an imaginary part axis. Further, a vector 302a is shown in the representation which corresponds to an (overall) light contribution of the pixel $p_1$. In contrary to FIG. 2, there is no differentiation between pixels 202a and 202c but the pixel $p_1$ can generate a light wave with a phase both in positive real part direction and in negative real part direction. The fact that the vector 302a is illustrated in that manner is due to the selection of the areas 320a, 320b of the phase element 320. In the detailed view 300a it can be seen that (when passing through twice) a phase difference of 180° exists between the light contribution of an "upper" first area of the pixel $p_1$ and tilted mirror, respectively, and a light contribution of a "bottom" second area of the pixel $p_1$ and tilting mirror, respectively. The vector 302b that can correspond to the pixel $p_2$ can be considered analogously. For the same, it is also possible to obtain a phase offset of 180° and $\pi$, respectively, by adjusting the tilting mirror. Thereby, it is possible to obtain a field strength or a negative field strength by a single pixel (and tilting mirror 311a, 311b), respectively, in cooperation with the phase element 320 (or two areas of the phase element 320).

In this embodiment, it can also be seen that the spatial light modulator 310, in this case corresponding to an analog tilting mirror arrangement, and the phase element 320 and the optical system 330 are arranged along a (continuous) optical axis. This continuous optical axis supports a good imaging quality by the optical system 330 and the imaging quality of the entire structure or optical arrangement 300. In the shown case, the phase element 320 is illustrated at a short distance from the spatial light modulator 310. This distance can be selected, for example, to be 2 mm. However, depending on the configuration of the spatial light modulator 310 or the phase element 320 or the incident light wave, other distances can be useful.

The optical arrangement 300 can also be described such that the spatial light modulator 310 comprises at least one area (for example 310a or 310b etc. or one pixel) with an optical path considered herein (also referred to as "distinguished optical path"). This optical path is defined such that the optical path can contribute to a superposition. Further, in the selected example, the phase element 320 is provided between a spatial light modulator 310 and an area of superimposition that is, for example, within the optical system 330. Further, the phase element 320 is configured such that the (resulting) phase of the considered optical path and the (resulting) phase of the (entire) light contribution of the considered optical path, respectively, comprise a specific phase in the area of superposition. With respect to the phase of the incident light, this phase can be, as shown, for example, in the example 0, 0.5 $\pi,\pi$ and 1.5 $\pi$.

Further, the spatial light modulator 310 can be configured such that the same is suitable to modulate several different distinguished optical paths (with regard to FIG. 3a: with the help of the individual tilting mirrors). Here, each of these optical paths can be configured to contribute to a superposition. In other words, each of the two tilting mirrors 311a, 311b is within one of the optical paths that are superimposed. This can also be understood such that a respective optical path is influenced such that this optical path has a desired phase, and that the light contribution has a desired phase after passing through, respectively. Thus, the phase element 320 is configured to change the phases of the light contributions that propagate along several different distinguished optical paths (for example via the first tilting mirror 311a or via the second tilting mirror 311b) to a different extent. For example, a phase contribution of the phase element in an optical path across the second tilting mirror 311b when passing through the phase element twice is by $\pi/2$ greater than a phase contribution in an optical path across the first tilting mirror 311a. Further, the arrangement 300 can be described such that the spatial light modulator 310 is configured such that different areas 310a, 310b of the spatial light modulator 310 are configured to modulate two different distinguished optical paths. Here, the optical paths are each configured to contribute to a superposition. Here, the phase element 320 is configured to adjust a difference of the phase change of the light contributions that propagate along the two different distinguished optical paths for example between 90° ±10°. This is equal to a difference of approximately π/2 between, for example, the areas 320a, 320b and the areas 320c, 320d of the phase element 320. A difference of the phase contributions of the areas 320a, 320b that are allocated to the same tilting mirror is for example π (calculated when passing twice through the phase element). The same applies, for example, to the area 320c and the area 320d of the phase element 320, where the difference between the phase change and the phase contributions, respectively, is again π and approximately 180°, respectively.

From these embodiments, a general embodiment can be derived where not only two but a different number greater than two of areas of the spatial light modulator 310 (or a greater number of tilting mirrors) is configured to modulate several optical paths. Here, the areas of the spatial light modulator 310 are configured to modulate several optical paths, i. e. to modulate a number of at least two optical paths, wherein each of the areas of the spatial light modulator 310 is allocated to several areas of the phase element 320. By this measure, for example, a resolution with respect to the number of areas of the spatial light modulator 310 could be increased. Here, the embodiment shown in FIG. 3a shows that, for example, four areas of the phase element, i. e. areas 320a, 320b, 320c and 320d of the phase element 320 with different phase influence are allocated to two areas of the spatial light modulator 310, i. e. the areas 310a and 310b to modulate at least two distinguished optical paths for forming a complex modulation cell.

A useful optical path can be an optical path passing first across the beam splitter 331, then across the phase element 320 and then across the spatial light modulator 310. Following that, the optical path passes again across the phase element 320, the beam splitter 331 and then again the optical system 330. In the area of the optical system 330, the optical path first passes through the first lens 333, then the aperture 335 and at last the second lens 337. This optical path is illustrated accordingly in FIG. 3a. However, it should be noted that, for example, an associated optical path can be allocated to each tilting mirror. As can be seen herein, it can be useful that elements of the optical system 330 (here the beam splitter 331) are passed before the two modulators 310 and 320 (or also between the two modulators 310, 320). However, one condition is that superposition (here for example in the area of the aperture 335) of the optical paths belonging to a complex modulation cell only takes place after passing through the spatial light modulator 310 and the phase element 320. In this description of the optical path it can be seen that the optical path passes twice through the phase element 320. This characteristic can be considered when configuring the phase element 320, since the same might involve other characteristics of phase gradation. If, for example, in a different optical path the phase element would be passed only once, it could be useful to double the respective (relative) phase influences and phase contributions, respectively.

Thus, FIG. 3a shows a complex modulation method with a reflective analog tilting mirror SLM 310 and a static phase element 320. Adjacent SLM pixels are phase-shifted by 0.5 π (due to the double passage phase shift 0.25 π between areas 320a, 320c and between areas 320b, 320d). Due the phase jump of π along their tilting axis (for example due to the phase jump of 0.5 π per passage between the areas 320a, 320b and between the areas 320c, 320d) the same modulate in two directions in the complex plane. A complex macro pixel consists of the two tilting mirrors $p_1$ and $p_2$ (in connection with the four areas 320a-320d of the phase element 320).

The illustrated invention can be realized in a particularly advantageous manner with an analog tilting mirror matrix (as an example of an advantageous embodiment for SLM, a spatial light modulator 310). Here, a complex macro pixel is generated of several (at least two) tilting mirrors 311 which can also generate negative field strengths with a specifically adapted static modulator (phase element 320). For this, a phase jump of π is aligned centrally along each tilting mirror 311. This effects a sign change of the modulated field in dependence of the tilting angle sign (FIG. 3a).

Additionally, the static modulator 320 is used to align the contributions of the pixels in the complex plane. In the embodiment with a complex modulation cell of two tilting mirrors as shown in FIG. 3a, this is obtained with a phase difference of 0.5 π of the two pixels to one another. Larger modulation cells, for example, four tilting mirrors in cooperation with static phase jumps of 0.5 π in the DOE can also be realized with the illustrated invention. Increasing the modulation cell effects an improvement of the complex resolution, i. e. a more precise discretization of the representable complex vectors.

Concerning the arrangement of the modulators, it can also be stated that the (static) (phase) modulator 320 can be arranged, for example, at a small distance to the (programmable) SLM 310. In the same way, the (static) (phase) modulator 320 can also be disposed in a conjugated optical plane (see FIG. 4). This can simplify adjustment and hence the practical realization.

The phase jump adaptation for generating negative field strength has already been described based on mere device integration [5]. The presented invention realizes this function with a flexible optical system structure by using the additional static modulator (phase element 320). This realizes enormous cost-related advantages and allows the usage of several light wavelengths for the first time.

In the realization option with tilting mirror matrices and phase jump DOE (FIG. 3a) it is already obvious that the size of a complex modulation cell can be reduced to two pixels. This increases the number of complex modulation cell with constant SLM resolution by at least 100%. Previously, this had only been possible with complex interference in the production process [5]. With the presented method, this can be obtained cost-effectively with a standard device produced according to specific specifications. Since the SLM itself is not amended, static phase modulators or phase elements (e. g. DOEs) can be designed for different wavelengths and merely be exchanged mechanically for multi-spectral operation as needed.

Additionally, it has to be stated that FIG. 3a shows a spatially resolved modulation area of a pixel at reference number 350. It is obvious that the amplitude over the location x (between −p/2 and +p/2) does not or only hardly vary. The phase, however, varies in the example at the reference number 350 for example between −135 degrees and +135 degrees.

A phase function across a plurality of tilting mirrors is indicated at reference number 321 and a section of the phase function is shown at reference number 317 (here for two tilting mirrors). Parametrization (over the location coordinate x) can be seen at reference number 317. Further, FIG. 3a shows the generated modulation values in the illustrated angle setting (in the shown angular position) in the complex plane (at reference number 301). Here, the tilting mirror acts as pure phase modulator (wherein amplitude modulation can be obtained as well together with a defined optical system). A curve parameter is here the location coordinate (x) within a micromirror having the side length p.

Additionally, it should be noted that the arrangement according to FIG. 3a could optionally also be changed. The embodiment according to FIG. 3a shows the generation of a phase jump for tilting mirrors by means of a static phase element (see also FIG. 3b). Introducing such a phase jump in combination with tilting mirror devices is also useful without positioning in the complex plane, i. e. without the 0.25 π phase difference in reference number 300a. In that way, negative field strengths are obtained, which are useful, for example, for lithography.

For further illustration, in the following, phase contributions along a light path in the optical arrangement 300 according to FIG. 3a will be described in more detail with reference to FIG. 3b.

A first schematic illustration 360 describes a phase response of an incident wavefront in dependence on a position x (wherein x values between −p/2 and +p/2 are allocated to a tilting mirror). As obvious from the schematic illustration 360, the phase for x between −p/2 and +p/2 is at least approximately constant (planar wave assumed).

The planar wave impinges then (for example originating from the beam splitter 331) on the phase element 320 and is then influenced in its phase by the areas 320a, 320b of the phase element 320 (wherein the areas 320a, 320b of the phase element essentially cover, for example, an area between x=−p/2 and x=+p/2, i. e. the same are arranged "in front of the tilting mirror 311a"). A boundary between the area 320a and the area 320b of the phase element 320 is, for example, at least approximately (in the direction of the optical axis) before a center of the tilting mirror 311a and a total width of the areas 320a, 320b corresponds, for example, approximately to a width of the tilting mirror (for example p).

As discussed above, a difference of the phase contributions of the areas 320a, 320b is approximately 0.5 π. A schematic illustration 370 describes a spatial phase curve of the incident light after the phase element. Due to the different phase contributions of the areas 320a, 320b of the phase element, the incident light has, for example, a phase jump of 0.5 π at x=0 (i. e. approximately in the center of the tilting mirror).

The tilting mirror effects a further phase contribution depending on the position of the tilting mirror and which is shown in the schematic illustration 380 for different positions of the tilting mirror.

In a first orientation of the tilting mirror shown by a continuous line, the tilting mirror provides in its "upper" area (between x=−p/2 and x=0) an "accelerating" phase contribution (shorter low-pass aperture) and in its "lower" area (between x=0 and x=+p/2) a decelerating phase contribution (longer light path) wherein the phase contributions essentially vary linearly over the location (coordinate x). The phase contribution is shown at reference number 382a.

In a second orientation of the tilting mirror shown by a dotted line, the tilting mirror provides a constant phase contribution across its entire extension in x direction. The second orientation corresponds, for example, to an orientation of the tilting mirror surface approximately perpendicular to the optical axis. The phase contribution is shown at reference number 382b.

In a third orientation of the tilting mirror shown by a dashed-dotted line, the tilting mirror provides in its "upper" area (between x=−p/2 and x=0) a decelerating phase contribution (longer light path) and its "lower" area (between x=0 and x=+p/2) an accelerating phase contribution (shorter light path), wherein the phase contributions essentially vary linearly over the location (coordinate x). The phase contribution is shown at reference number 382c.

The phase contribution of the tilting mirror as shown at reference number 380 is added to the phase curve of the incident light as shown at reference number 370, such that a phase curve of the light reflected or diffracted by the tilting mirror results as shown in the schematic illustration 390. It is obvious that the phase curves over the x coordinate differ heavily in dependence on an orientation of the tilting mirror.

During a further passage through the phase element, the phase curve is influenced further, wherein the phase contributions differ by approximately 0.5 π in the areas 320a, 320b of the phase element. After a renewed passage of the light through the phase element 320, a phase curve as shown in a schematic illustration 396 results. By passing twice to the phase element, a phase jump of approximately π results in the center of the tilting mirror (for example at x=0). The curves of the phase differ significantly in dependence on the orientation of the tilting mirror, as indicated by phase curves 398a (first orientation), 398b (second orientation) and 398c (third orientation).

Additionally, it should be noted that the amplitude of the light from the tilting mirror is, for example, approximately constant between x=−p/2 and x=+p/2. In the following, it is assumed that the light contributions of a tilting mirror are imaged in a superimposed manner. This corresponds essentially to in-phase summation of the light contributions originating from the positions between x=−p/2 and x=+p/2.

It can be easily seen here that with a "symmetrical" orientation of the tilting mirror the light contributions at least approximately cancel each other out since light contributions from a first area (between x=−p/2 and x=0) and light contributions from a second area (between x=0 and x=+p/2) are phase-shifted by 180 degrees. A more accurate analysis shows further that a sum of the light contributions have opposite phases in the first orientation of the tilted mirror (continuous line) and in the second orientation of the tilting mirror (dash-dotted line). Amplitudes of the sum light contributions are further also adjustable by influencing the orientation of the tilting mirrors.

Here, it should be noted that the sum light contribution comprises a sign change due to the presence of the phase element in the "resting position" of the tilting mirror (perpendicular to the optical axis). Thus, a large phase change can also be obtained by a comparatively small deflection of the tilting mirror ("point-symmetrical character" of the deflection sum light phase characteristic curve). In contrary to that, when the phase element lacks, there are symmetrical conditions and a sign change (phase jump of 180 degrees) could only be obtained with a very large deflection of the tilting mirror with additionally limited amplitude (axisymmetrical character of the deflection sum light phase characteristic curve). Further, in some embodiments, an extended amplitude area can be adjusted due to the presence of the phase element.

Additionally, it should be noted that the phase element could also be configured differently. For example, three or more areas of the phase element with different phase contributions could be allocated to a tilting mirror. In this regard, reference is made to a section of a phase element as shown in FIG. 3c in cross-section and in top view. The phase element shown in FIG. 3c can be used, for example, instead of the phase element shown in FIG. 3b.

Thus, there is an option of using the freedom of providing several phase values on the phase element for modulator pixel advantageously with respect to the spectral behavior of the arrangement. This concept (for a micromirror device) is explained, for example, in source [5]. In embodiments according to the invention, a similar functionality is obtained with the external phase element (instead of by manufacturing variations). For example, for a desired modulator pixel phase shift of, for example, 90° different phase stages (e. g. 90°, and −270° can be determined which generate the desired phase in the local average. At the same time, the behavior of this modified phase curve is better than when selecting only a phase stage of 90°. For further details see the explanations below.

Figure 4:
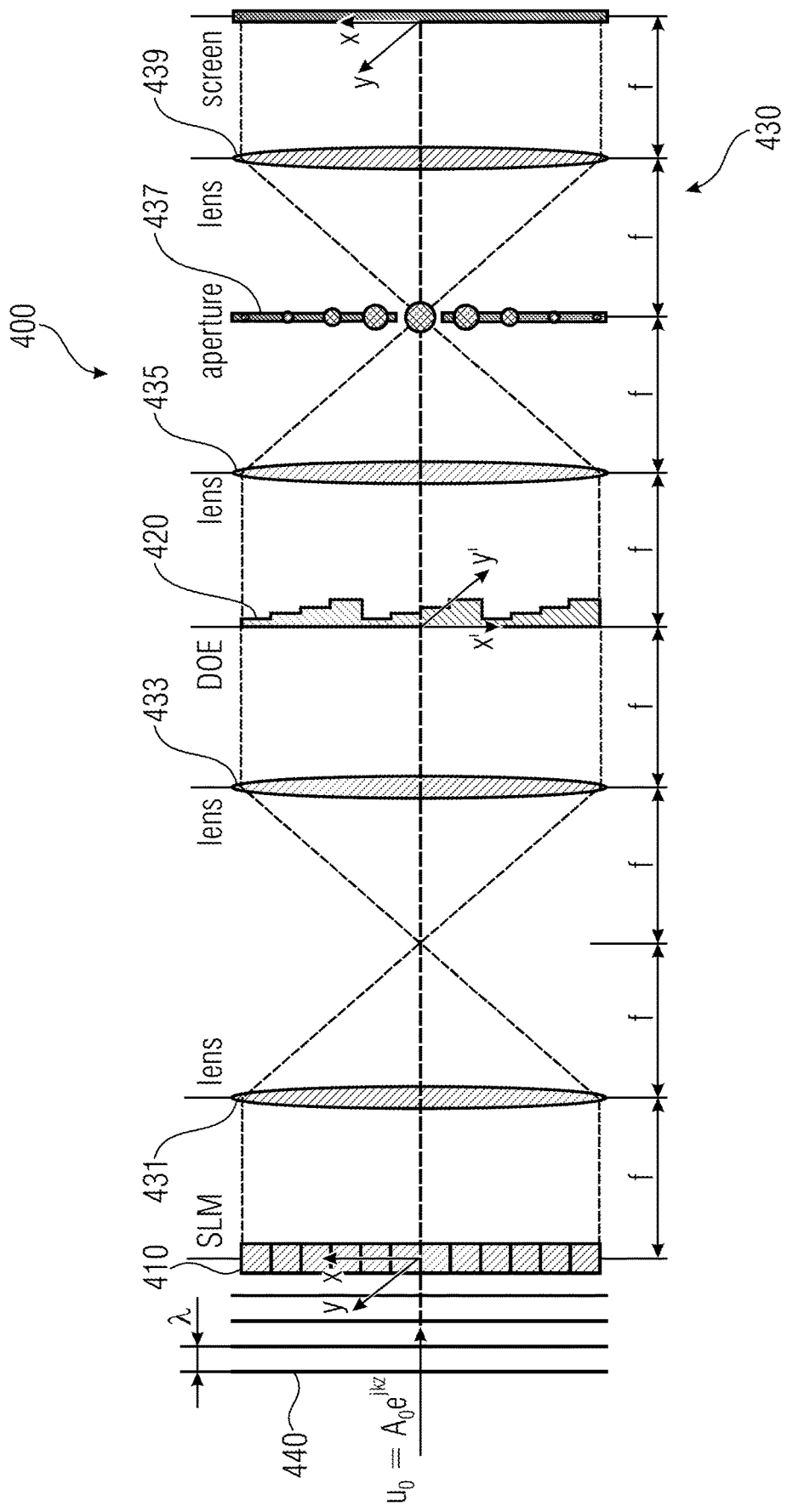
FIG. 4 is a schematic illustration of an optical arrangement with a diffractive optical element in a conjugated optical plane according to an embodiment of the present invention.

Embodiment According to FIG. 4

FIG. 4 shows an optical arrangement 400. FIG. 4 shows an equivalent realization of the described modulation method in an 8f arrangement. Here, the static DOE (phase element) 420 is arranged in a conjugated plane to the programmable SLM (amplitude spatial light modulator) 410. This setup is functionally identical to the setup in FIG. 2.

Here, the optical arrangement 400 comprises a spatial light modulator 410 and a phase element 420. Further, the optical arrangement 400 comprises an optical system 430 comprising several elements. Part of the optical system can be a first lens 431, a second lens 433, a third lens 435, an aperture 437 and a fourth lens 439. The distance of the first lens 431 from the spatial light modulator 410 corresponds approximately to a focal length f of the first lens 431. The second lens 433 has a distance from the first lens 431 of the sums of the focal lengths of the two lenses f+f or in the illustrated case the double focal length 2f. The phase element 420, which can also be a diffractive optical element (DOE) is provided at a distance of a focal length f. The third lens 435 is also disposed at a distance of, for example, a focal length f from the phase element 420. The aperture 437 is between the third lens 435 and the fourth lens 439 that are provided at a distance of 2f. Again, possible manifestations of orders of diffraction are illustrated on the aperture 437. In this embodiment, the aperture 437 can be configured to allow zero-order diffraction to pass through. Higher orders of diffraction, such as ±1, ±2, ±3 etc. can be blocked by the aperture 437. The focal lengths of the lenses can obviously be different wherein then the distances are to be adapted accordingly.

In this embodiment, the aperture 437 can also obtain a low-pass effect that can superimpose several (adjacent) areas of the spatial light modulator 410 to a complex macro pixel (complex modulation cell).

In the presented embodiment, a planar wave 440 described by $u_0 = A_0 \cdot e^{jkz}$ impinges from the left onto the spatial light modulator 410 indicated by SLM. This planar wave or planar wavefront 440 has a wavelength of $\lambda$ also indicated in FIG. 4. Further, the optical arrangement 400 can be described such that the phase element 420 is provided, for example with a low tolerance of ±2 mm, in an optically conjugated plane of the plane of the spatial light modulator 410. This conjugated optical plane is indicated by a coordinate system indicated by x' and y'. The coordinate system of the SLM or the spatial light modulator 410 is indicated by x and y (i. e. not optically conjugated).

Further, FIG. 4 comprises a screen on which the complex-valued light field generated with the help of the spatial light modulator 410, the phase element 420 and the optical system 430 can be imaged. The coordinate system of the screen is (analogously to the coordinate system of the spatial light modulator 410) indicated by x and y (i. e. not optically conjugated).

In the embodiment according to FIG. 4, it is indicated by the periodicity of the phase element 420 that the same comprises four different areas of different phase changes within one period. Further, it can also be stated that a useful embodiment can also be configured such that several areas of the phase element 420 forming a complex modulation cell with several areas of the spatial light modulator comprise at least three areas with different phase influences. This would show in FIG. 4 in a periodicity after three stages of the DOE in contrary to the illustrated four stages of the DOE. Here, the difference between an angle of a first influence and an angle of a second influence is 180° at the maximum. Here, a first angle and a second angle of the phase influence are defined such that no third angle of a phase influence lies between these two angles. In other words, this could be stated such that the first angle and the second angle are adjacent. Further, the optical system 430 is configured to allow superposition of the optical paths belonging to the complex modulation cell. This can be enabled, for example, by superposing three optical paths belonging to a complex modulation cell.

The described option of three different areas of phase influence can also be generalized further. Here, the phase element 420 comprises several areas forming a complex modulation cell with several areas of the spatial light modulator 410. Here, the several areas of the phase element 410 have exactly n areas with different phase influence. An advantageous embodiment can be configured such that a difference between an angle of a first influence and an angle of a second influence is approximately 360°/n. "Approximately" can mean that the angle of the first phase influence has a difference to the angle of the second phase influence which is 360°/n with a tolerance of 360°/2n. This obviously includes also the embodiment where the angles between all adjacent phase influences are approximately 360°/n.

By the spatially separate structure of the phase element 420 from the spatial light modulator 410 it can be possible in a simplified manner to obtain mechanical exchangeability of the phase element. Here, a plurality of (different, exchangeable), for example, static phase elements can be configured to impress, for several light wavelengths, an advantageous phase offset for a complex light field onto a light field. Further, the separate mechanical attachment of the amplitude spatial light modulator 410 from the phase modulator 420 can facilitate calibration of the entire structure.

A useful optical path considering no scattering and diffraction and other undesired ("parasitic") effects, i. e. some sort of functional optical path can be an optical path passing first across the amplitude spatial light modulator 410, then across the optical system 430 and the phase element 420. In the area of the optical system 430, the optical path first passes through the first lens 431, then the second lens 433 followed by the phase element 420 (which is not part of the optical system 430). Then, the optical path passes through the third lens 435, the aperture 437 and at last the fourth lens 439. This is illustrated accordingly in FIG. 4. On the other hand, it is also possible that the optical path passes first through the phase element 420 (for example at the location of the spatial light modulator 410) and only then the spatial light modulator 410 (for example at the location of the phase element 420). In this embodiment, it can also be seen that elements of the optical system 430 are passed through before the two modulators 410 and 420 or between the two modulators 410, 420. However, one condition is that the superposition (here, for example, in the area of the aperture 437) of the optical paths belonging to a complex modulation cell only takes place after passing through the spatial light modulator 410 and the phase element 420.

Accordingly, FIG. 4 shows an optical arrangement 400, wherein the spatial light modulator 410 and the phase element 420 form a plurality of complex modulation cells. For example, this can also be illustrated such that the phase element 420 comprises a plurality of modulation cell capable phase stages. In the selected case, the illustration shows an option of three complex modulation cells (three times four different thicknesses of the phase element 420 or three times four different optical path lengths and hence phase offsets). Here, the low number of complex modulation cells mainly serves for a better overview and illustration purposes, a scaling having several thousand modulation cells can be realized with the presented inventive solution. Further, the sectional view does not explicitly show that the phase element 420 as well as the spatial light modulator 410 as well as the optical system 430 or the optical arrangement 400 can have an extension in the y-axis. Here, obviously, the option exists that further areas of the spatial light modulator 410 and also further areas of the phase element 420 can be provided in an y-axis. Thus, with the shown embodiment, it is possible to generate a plurality of complex modulation cells in several spatial directions. Here, the optical system 430 is configured to image the plurality of complex modulation cells separately. For example, a complex modulation cell can be imaged as image point on the screen illustrated in FIG. 4 on the right.

In FIG. 4 and analogously to FIGS. 1, 2 and 3, it is possible that the phase element 420 is configured to allow a time-variant influence of the phase. Thus, the phase element 420 can also be referred to as non-static. In that way, it is also possible that the phase element 420 is configured such that the same is programmable and adjustable, respectively. With a phase element 420 according to the just stated characteristics it would be possible, for example, to change the change of the phase during operation. For such a non-static phase element 420, for example, a liquid-crystal phase modulator can be used.

Here, it should be noted that a slow modulation by the phase element 420 can be compensated by the fast modulation by the spatial light modulator. It would be possible, for example, that a change of the amplitude of a light field by the spatial light modulator 410 is, for example, by a factor of 10 faster than a change of the influence of the phase by the phase element 420 (wherein advantages can already result with a factor of 2).

Figure 5:
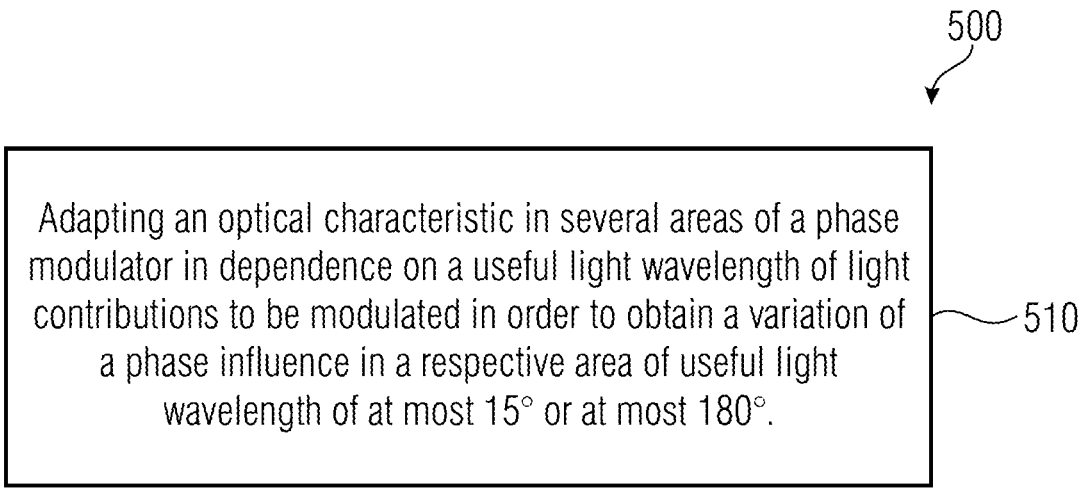
FIG. 5 is a flow diagram of a method according to an embodiment of the present invention.

Embodiment According to FIG. 5

FIG. 5 describes a method for operating a combined spatial light modulator for generating a complex-valued light field.

For operating the phase element at a single wavelength, it is sufficient to realize a sufficient number of (e. g. a number of three) discrete phase changes. A superposition of the light contributions (with discretely changed phases) in combination with an adjusted amplitude of the light contributions allows, depending on the accuracy of the amplitude modulation, a very precise adjustment of the phases, even with angles that lie between the discrete phase changes. The stated phase changes can, for example, be 0°, 120° and 240° (or 0, 2 π/3 and 4 π3). Here, it has to be considered that these phase changes relate to the wavelength of the light contribution. For obtaining a phase delay of 2 π/3, this corresponds to λ/3, the respective light contribution has to pass through an optical path length which is by λ/3 longer than an optical path length of a reference light contribution to be passed through. Thus, the phase change of a single light contribution that can be obtained with a static phase element normalized to one wavelength. If a desired (optimum) phase change is to be obtained for different wavelengths, it is advantageous to adapt the phase element accordingly.

Here, the method 500 includes adapting 510 an optical characteristic in several areas of a phase element in dependence on a useful light wavelength of light contributions to be modulated in order to obtain that a phase influence in a respective area of the phase element varies across an area of useful light wavelengths of at most 180°.

It should be noted that a complex modulation of different light wavelengths not necessarily necessitates a time-variant adjustable or programmable phase element having absolute accuracy of the phase adjustment with respect to the useful wavelength. Therefore, the embodiment with adjustable phase element represents an embodiment that can obtain very good modulation even when a wavelength-dependent change of the phase change obtained by the phase element exists (in this embodiment 180°). As a limiting case, the option of modulating different light wavelengths (in a light wavelength area between a minimum and a maximum wavelength) in amount and phase with a static phase element can be stated.

This can be obtained in that the static phase element is configured such that it is ensured for the limits (the limiting wavelengths) of the light wavelength area that an angular area of 360° is covered by amplitude-modulated superposition of the phase-modulated light contributions. With an example of three areas of different phase changes, the example can be explained such that for the maximum wavelength, for example, a phase change is 0°, 90° and 180° (normalized to the maximum wavelength). Thus, for a minimum wavelength, which is half of the maximum wavelength, the phase change would accordingly be 0°, 180° and 360° (normalized to the minimum wavelength). With this selection of the phase changes and the minimum and maximum wavelength it is possible to adjust the wavelength between (excluding) the minimum and (excluding) the maximum wavelength in its phase (with a limited amplitude area). By this configuration of a static phase element in connection with several different wavelengths, the range of obtainable amplitudes of the sum light might be very limited. In order to be able to obtain a (sum) vector with all phase angles with a limited number of (contribution) vectors by adding the (contribution) vectors, it should, for example, be ensured that all half-planes comprise at least one (contribution) vector. "All half-planes" relates to all planes limited by a zero-point straight line on one side wherein the angle of the zero-point straight line with the abscissa can assume any possible values. This general statement can represent an identification option of the needed discrete phase changes. This statement does not apply when at least two separate phase elements exist, in this the case the selection of the (contribution) vectors for one phase element can be made freely, but the above statement applies again for the entire number and the entire effect, respectively, of the phase elements if all phase positions, i. e. all angles of 0° to 360° of a sum vector are to be obtained.

Thus, an adjustable phase element that can adapt the change of the phase during operation, for example, by suitable control is able to adjust a phase (and indirectly an amplitude) of a sum light very exactly, even with a significant deviation from an exact adjustment of the phases of the individual light contributions. As already mentioned, during operation, the change of the phase can be adapted by the phase element to a changed (also changing during operation) light wavelength. Here, it can also be the aim of the change that the discrete phase steps (for example with 0, 2 π/3 and 4 π/3) are maintained within a modulation cell of the phase element, i. e. the different areas of the phase element with the different phase changes even when the light wavelength changes.

Concerning the optical characteristic it should be stated that the optical characteristic can enable a change of a phase of a light contribution. In the above paragraphs, for example, an optical wavelength has been stated that has a differing length in different areas, but the optical characteristic is not limited to that. Rather, different options of changing the phase position of several optical paths with respect to one another not mentioned herein can be included.

Figure 6:
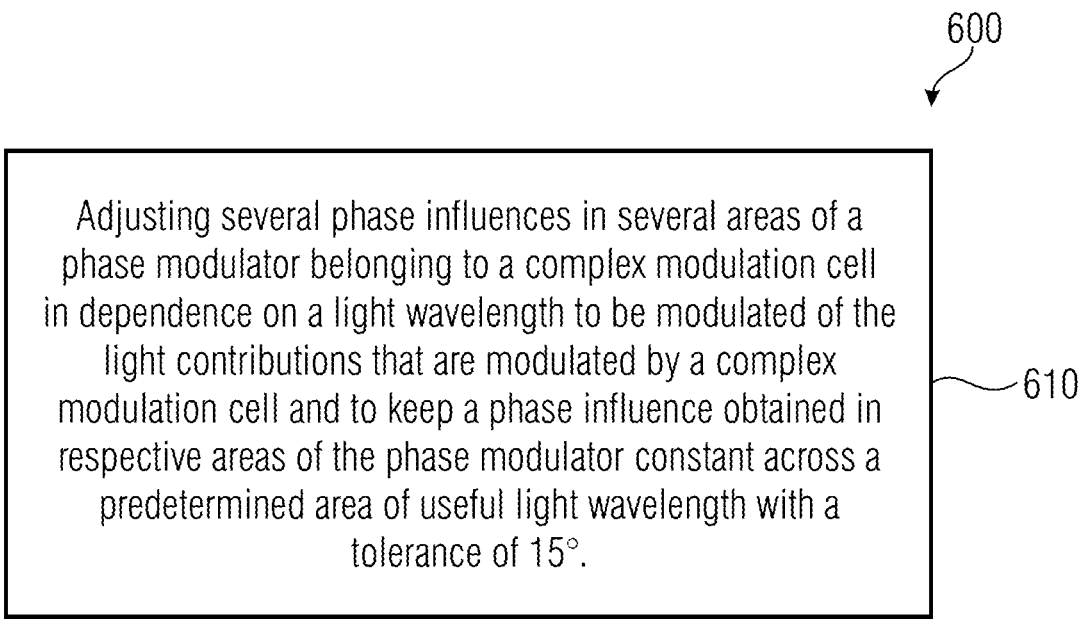
FIG. 6 is a flow diagram of a method according to an embodiment of the present invention.

Embodiment According to FIG. 6

FIG. 6 describes a method for operating 600 an optical arrangement for modulating different light wavelengths with the following feature: adjusting 610 several phase influences in several areas of a phase element belonging to a complex modulation cell. Adjusting 610 is performed in dependence on a light wavelength of light contributions to be modulated that are modulated by a complex modulation cell and to keep a phase influence which is obtained in respective areas of the phase element constant across a predetermined area of useful light wavelengths, e. g. with a tolerance of 15°. Adjusting the phase influences in several areas of the phase element can be performed, for example, by exchanging the phase element or by a programmable realization of the phase element (wherein an adjustment velocity of the phase element is typically slower than an adjustment velocity of the spatial light modulator).

This embodiment provides a method allowing modulation with the help of the phase and amplitude spatial light modulator arrangement of several (different) light wavelengths. Here, by adjusting 610 several areas of a phase element it is obtained that the phase influences (provided, for example, in discrete stages) can be adapted to a light wavelength to be modulated (which may vary or has been varied). Here, again, a tolerance is provided since absolute (perfect) accuracy cannot be obtained and even with this relatively large tolerance, very good adjustment according to amount in phase can still take place. In this context, reference is made to the embodiment according to FIG. 5 in the context of which this is explained in detail.

By using zero-order diffraction, this adaption of the phase changes only becomes possible. When using a higher order of diffraction, the location of this order of diffraction depends on the (diffracted) wavelength and, for example, an aperture (fading aperture) configured for a wavelength in connection with a (higher) order of diffraction would no longer fulfill its predetermined purpose at a different wavelength.

Here, it should be noted that different areas can belong, on the one hand, to a complex modulation cell but obviously different areas can also belong to different modulation cells. Further, in the embodiment of the operating method described herein, several phase influences are adjusted. This adjusting can obviously be different for different areas. As one example, the case where several areas forming a first modulation cell are adapted to a first light wavelength can be considered, and also where further several areas forming a second modulation cell are adapted to a second light wavelength. This option is also included in the operating method but is to be mentioned here again for clarity reasons.

Additionally, reference is made to the option of performing the mostly achromatic light modulation of the present invention by suitably separated areas of the phase element within an area of the spatial light modulator. This is characterized by the formation of the desired phase of the light field which can be predetermined for one or several areas of the spatial light modulator and to realize the same in that several partial areas of the phase element actually deviate from the desired target phase, wherein the non-chromatic light spectrum determines the partial segments in that i) the phase-shifts of the partial areas are dimensioned according to the existing wavelength spectrum and simultaneously ii) the area portions of the partial areas are configured such that the phase of the desired light distribution can be configured by the area average of the phase partial areas, see in this regard also [5].

Generally, it should be noted that in the above embodiments (implicitly) the same number of areas are combined to one modulation cell. Obviously, different numbers of areas can also form one modulation cell. This can impose further requirements, for example for the low-pass filter, but this will not be discussed herein in further detail.

Thus, the inventive solution allows the usage of several light wavelengths or the usage of monochromatic, sequentially or spatially parallel at several wavelengths and possibly spectral broadband sources with filter for generating a complexed-valued light field with one structure. This represents a great advantage of the inventive solution with respect to conventional technology.

Embodiment According to FIG. 7

FIG. 7 describes a method for operating 700 and optical arrangement with the following features: adjusting 710 a spatial light modulator for modulating light intensities in at least two optical paths passing through areas of the spatial light modulator that are imaged in a superimposed manner and in which phase modulations are performed to a different extent. In a first adjustment state, a first distribution of the line intensities exists in the at least two optical paths and thereby light of a first phase position is obtained. In a second adjustment state, a second distribution of the light intensities exists in the at least two optical paths which differs from the first distribution of the light intensities, thereby light of a second phase position is obtained.

Thus, FIG. 7 describes a method for operating 700 an optical arrangement. By this operation 700, sum light and light image points, respectively, can be generated. A single light image point can be obtained by superposing several light contributions of different phase positions. Here, the method comprises adjusting 710 a spatial light modulator for generating a complex-valued light field with a phase modulator. Additionally, the phase modulation is configured to influence the phases of several light contributions that are imaged in a superimposed manner to one light image point such that the vectors or the superimposed vectors of the light contributions with the changed phase span, for example in connection with the modulated amplitude of the light contributions, an area in the complex plane where a vector of the light image point can be selected. These several light contributions are characterized in that the same propagate from the area of superposition (or the superimposed imaging) along separate optical paths. Here, the superimposed vectors can result, for example, in a sum vector and the spanned area in the complex plane is not only determined by individual vectors but can be obtained by useful addition (superposition) of the individual vectors. In FIGS. 2 and 3, with the illustrated equal amplitude of all pixels and the phase offset of 90° of the pixel to one another, areas corresponding to a square would result in the complex plane. The center of the sides of the square is generated by the individual vectors and the vertex is obtained by superposing the full amounts of two adjacent vectors.

This method can be performed, for example, with the help of vector addition of the amplitudes and the phases of the first and second light contributions in the complex plane and can also be calculated. This vector addition can be performed, for example, analogously to the vectors illustrated in FIGS. 2 and 3 and the vector addition in FIG. 2 in the complex plane. Here, it can be considered as a feature that the phase element is advantageously configured to cover a useful area of the complex plane by (vector) addition of the individual light contributions. Obviously, it can also be desirable to cover only partial areas of the complex plane, wherein the areas of the phase element can be configured such that, for example, only phases can be adjusted that lie, for example, in a quadrant of the complex plane. Configurations covering a specific (for example also limited) angular range of the complex plane would also be realizable with the help of the inventive solution.

Thus, the inventive solution provides a method for modulating light in amplitude and phase by using zero-order diffraction. The inventive solution can be used in the context of a plurality of applications that use spatial light modulators, diffractive optics, complex light, digital holography or phase modulation or are aimed at the same.

Advantages of the Inventive Solution Compared to Conventional Solutions

In the inventive solution, it is possible to dispense with fast discrete high-resolution phase modulators as the same are only available to a limited extent, further, the requirements for alignment of the optical components in the inventive solution are easy to obtain. In conventional technology, it can be seen that, for example, sequential imaging onto two different SLMs [1] is only rarely used since this structure involves very exact alignment of the optical components. Additionally, there is the limited availability of fast discrete high-resolution phase modulators and the high costs in connection with the acquisition of such components.

The limited availability of suitable phase modulators has also the effect that the concept of Florence [4] is hardly used in practice.

In practice, approaches based on Lee holography can be found frequently. Both Lee and von Putten et al. use the first order of diffraction of a periodic pattern programmed into the SLM.

However, according to the inventive solution, a minimum of even two spatial light modulator elements (for example 2 mirrors when using a tilting mirror arrangement) is possible and good results can be obtained thereby.

Figure 8:
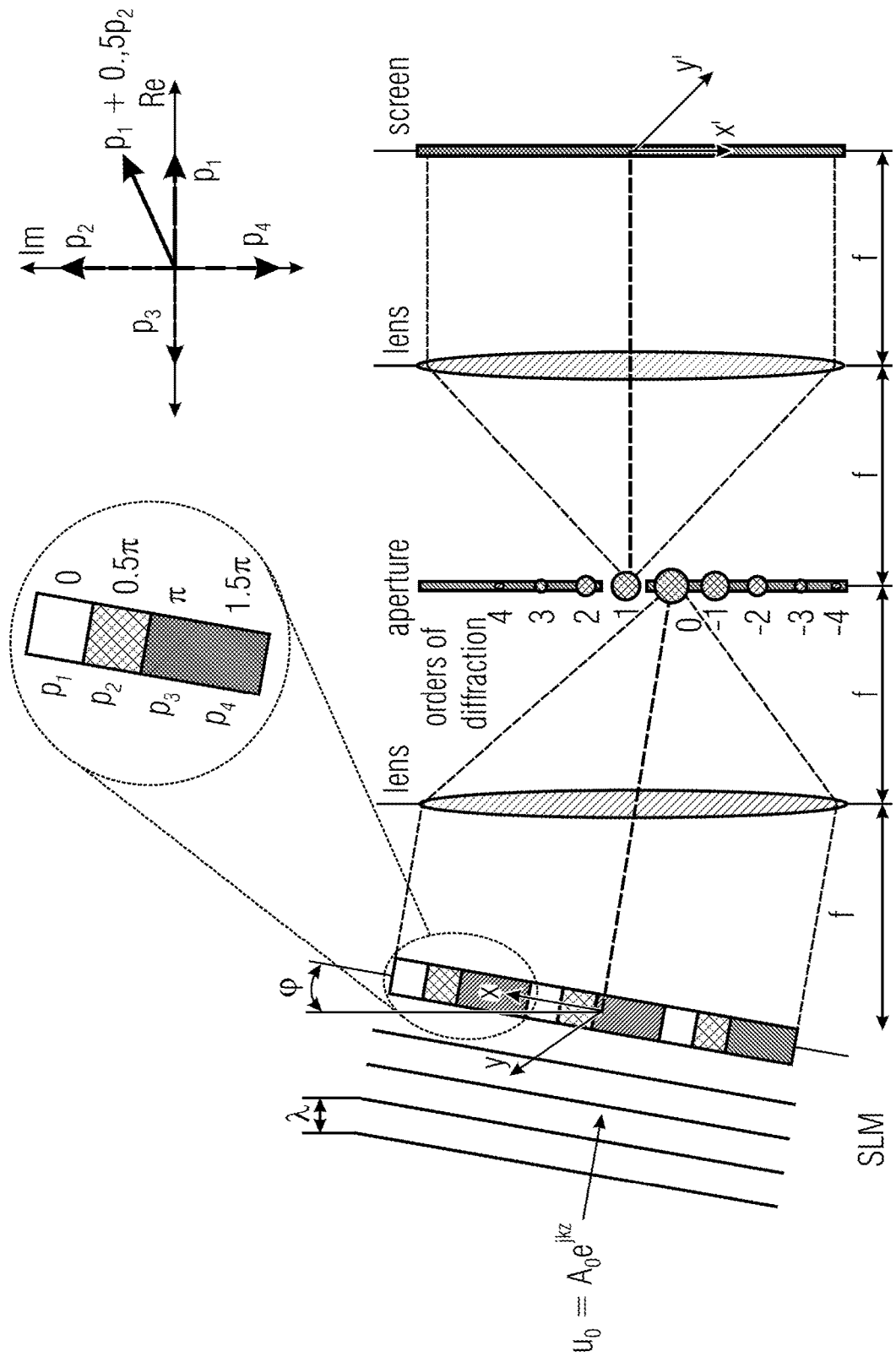
FIG. 8 is a schematic illustration of conventional technology.

Further, it is an advantage that the location of zero-order diffraction used in the inventive solution shows no dependence on the wavelength and hence not only one but several wavelengths and wavelength areas, respectively, can be used. Concept [3], on the other hand, is exclusively suitable for monochromatic light and single wavelength structures. If the spectral characteristics of real light sources are considered, wavelength-dependent deviations have to be expected inherently with this method. They are called so-called chromatic aberrations. The reason for that is the spatial position of the first orders of diffraction which possibly depend linearly on the wavelength X. Only light in this order of diffraction propagates to the system output. This results in a twist (alternatively a shift) of the optical axis (see FIG. 8). The needed twist/shift of the optical axis is also linearly dependent on the wavelength λ. Thus, real systems are very limited by the very inflexible system structure.

The inventive solution can be configured such that the same comprises a continuous optical axis, optical members are typically corrected during production along their optical axis. Rotation of the optical axis as needed in [3] can have an additional negative effect on the imaging quality of optical structures. Due to the fact that the same is not necessitated in the inventive solution, the imaging quality can be improved by using the inventive solution.

It is a further advantage of the inventive solution that a standard SLM (spatial light modulator) can be used, it is hence not needed to interfere with the production process of the SLM. The technological implementation of the concept according to Sandström [5] can at the same time be referred to as the expensive known solution, since the difficult production process of the SLM in microsystem technology has to be significantly interfered with. For this, novel so-called phase-step mirrors are generated. So far, no comparable modulator is known where this approach has already been mastered also as regards to manufacturing technology, including the additional phase adaptations. Finally, it has to be stated that the vector adaptation for complex modulation is firmly introduced into the device, for example by means of an etching process. Thus, in conventional technology, the parameters of this adaptation depend on the wavelength. Thus, optimum functionality is only given for a single design wavelength. In contrary to that, by using the inventive solution, it can be obtained that complex-valued modulation even of several light wavelengths can be performed with the same structure.

Further Aspects

In the following, some general ideas and aspects of the invention will be discussed.

An embodiment of the invention provides an optical arrangement and a method for generating light field distributions that can be adjusted spatially and possibly temporally with varying amplitude and phase.

The optical arrangement for generating a variable light field distribution comprises a combination of a spatial light modulator and a phase element within an optical structure with Fourier filter and electronic control unit. The apparatus is configured to generate a programmable light field that can be adjusted spatially and possibly temporally with varying amplitude and phase.

One aspect of the invention relates to a method for operating a spatial light modulator in the above-stated optical apparatus for generating a complex-valued light field. The method includes defined adaptation of a phase modulator (or phase element) and low-pass filter to a spatial light modulator as well as addressing the spatial light modulator with cell regions whose effective field strength average determines the representation of variable light field distributions.

One aspect of the invention relates to an optical arrangement for generating light field distributions that can be adjusted spatially and possibly temporally with varying amplitude and phase. The arrangement comprises a combination of programmable spatial light modulator "SLM" (1)

(either as pure phase modulator or as combined amplitude/phase modulator), phase element (2), optical low-pass filter (3), (optional) illumination unit (4) and (optional) control means (5).

The optical arrangement is additionally characterized, for example, in that
- at least one mask level (E), one pupil plane (P) and one image plane (E') and possibly further optical planes (E', P') conjugated with respect to the above are provided by a combination of lenses or mirrors and/or
- the spatial light modulator (1) and the phase element (2) are irradiated in the same or conjugated optical mask plane (E/E') by light (5) of the illumination unit (4) and/or
- an imaging path is realized which arranges zero-order diffraction of the pupil plane on the optical main axis and/or
- the low-pass filter (3) limits the area of the zero-order diffraction in the pupil plane P/P' and/or
- the control unit (5) addresses the light modulator (1) and possibly the illumination unit (4) and the phase element (2), respectively, and/or the low-pass filter (3).

Optionally, for example, spectral variation of the light source can take place.

A further aspect according to the invention provides a method for generating light field distributions that can be adjusted spatially with varying amplitude and phase, for example in the above-described arrangement. The method is characterized, for example, in that
- each point of the desired light field is controlled by a group of at least two pixels, i. e. by a so-called "modulator cell" of the spatial light modulator (1) in the mask plane; and/or
- an optical low-pass filter (3) for limiting the diffraction intensity is used in a pupil plane P/P' and dimensioned such that two or more adjacent pixels of the spatial light modulator (1) are superimposed to an effective image point in the image plane and/or
- on the phase modulator (or on the phase element) (2), at least two phase stages are configured in a spatially distributed manner, such that pixels of a "modulator cell" generate the complex field strength plane in four quadrants for each point of the desired light field.

One or several of the following aspects can additionally be realized:
- variation cell size and geometry from 2×2 and 2×1, respectively,
- variation/adaptation low-pass filter according to geometry and wavelength
- variation phase modulator (or phase element) according to wavelength and target distribution
- variation of the source According to a further aspect of the invention, instead of adjusting the phase (for example by the phase element) or in addition to adjusting the phase, polarization is adjusted (for example by a polarization element). Therefore, for example, amplitude, phase and polarization can be adjusted. In addition to the elements used for adjusting amplitude and phase, a polarization element can be used. For the concept described herein, pixelated polarization elements that are typically not evenly distributed are most suitable. These are specific members offered by some manufacturers, for example as custom-made product. The pixelated character of the polarization element offers significant advantages for realization.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] R. D. Juday, "Full complex modulation using two one-parameter spatial light modulators," U.S. Pat. No. 5,416,618, May-1995.

[2] W. H. Lee, "Sampled Fourier transform hologram generated by computer," Appl. Opt., vol. 9, no. 3, pp. 639-643, 1970.

[3] E. G. van Putten, I. M. Vellekoop, and A. P. Mosk, "Spatial amplitude and phase modulation using commercial twisted nematic LCDs," Appl Opt, vol. 47, no. 12, 2008.

[4] J. M. Florence, "Spatial light modulator with full complex light modulation capability," U.S. Pat. No. 5,148,157, Sep-1992.

[5] T. Sandström, "Spatial light modulator with structured mirror surfaces," WO002009130603A2.

[6] T. R. Hillman, T. Yamauchi, W. Choi, R. R. Dasari, M. S. Feld, Y. Park, and Z. Yaqoob, "Digital optical phase conjugation for delivering two-dimensional images through turbid media," Sci. Rep., vol. 3, May 2013.

[7] I. M. Vellekoop, "Feedback-based wavefront shaping," Opt. Express, vol. 23, no. 9, p. 12189, May 2015.

[8] S. N. Chandrasekaran, H. Ligtenberg, W. Steenbergen, and I. M. Vellekoop, "Using digital micromirror devices for focusing light through turbid media," 2014, p. 897905.

[9] T.-C. Poon and J.-P. Liu, Introduction to modern digital holography : with MATLAB, Repr. with corrections. Cambridge: Cambridge University Press, 2014.

[10] James M. Florence, Richard D. Juday, "Full Complex Spatial Filtering with a Phase Mostly DMD", SPIE Wave Propagation and Scattering in Varied Media II, Vol. 1558, 1991.

The invention claimed is:

1. Optical arrangement for generating light field distributions that are adjustable with varying amplitude and phase, comprising:
- a programmable spatial light modulator;
- a phase element and
- an optical system;
- wherein the phase element is configured to effect at least two or more phase contributions on adjacent modulator image points;
- wherein the optical system is configured to image several areas of the spatial light modulator in a superimposed manner;
- wherein the spatial light modulator and the phase element are arranged within a depth of field of a plane or conjugated optical mask planes, and
- wherein the spatial light modulator is configured as phase modulator or as combined amplitude and phase modulator and
- wherein the optical arrangement is configured to realize a predeterminable complex light field distribution in a subsequent image plane;
- wherein the optical arrangement comprises an optical low pass filter for limiting a diffraction intensity in a pupil plane, which is dimensioned such that two or more adjacent image points (pixels) of the spatial light modulator are superimposed to an effective image point in the image plane.

2. Optical arrangement according to claim 1, wherein the optical arrangement is configured to use a predetermined order of diffraction for optical filtering.

3. Optical arrangement according to claim 1, wherein the optical system is configured to image several areas or several adjacent areas of the spatial light modulator as a complex modulation cell.

4. Optical arrangement according to claim 1,
wherein the optical low-pass filter is configured to superimpose several areas or several adjacent areas of the spatial light modulator to a complex modulation cell.

5. Optical arrangement according to claim 1, wherein the optical system comprises a low-pass aperture which realizes a function of the optical low pass filter, and
wherein the low-pass aperture is configured to superimpose several areas or several adjacent areas of the spatial light modulator to a complex modulation cell.

6. Optical arrangement according to claim 1, wherein the spatial light modulator is formed by using a microelectromechanical system or a tilting mirror arrangement or a digital micromirror arrangement or a liquid-crystal arrangement.

7. Optical arrangement according to claim 1, wherein the phase element comprises a time-invariant influence of the phase.

8. Optical arrangement according to claim 7, wherein the phase element is a diffractive optical element.

9. Optical arrangement according to claim 7, wherein the phase element comprises at least one plate; and
wherein different optical paths that are imaged in a superimposed manner pass through different optical path lengths influenced by the plate of the phase element.

10. Optical arrangement according to claim 7, wherein the phase element comprises a plate with areas of different thicknesses; and
wherein different optical paths that are imaged in a superimposed manner pass through different optical path lengths influenced by the different thicknesses of the plate.

11. Optical arrangement according to claim 7, wherein the phase element comprises a plate with areas of different indices of refraction; and
wherein different optical paths that are imaged in a superimposed manner pass through different optical path lengths influenced by the different thicknesses of the plate.

12. Optical arrangement according to claim 1, wherein the phase element is configured to allow a time-variant influence of the phase.

13. Optical arrangement according to claim 12, wherein the phase element is programmable.

14. Optical arrangement according to claim 12, wherein the phase element is a liquid-crystal phase modulator.

15. Optical arrangement according to claim 12, wherein a change of the adjustment of the phase or the phase and amplitude by the spatial light modulator is by at least a factor of 2 faster than a change of the influence of the phase by the phase element.

16. Optical arrangement according to claim 1, wherein the spatial light modulator and the phase element and the optical system are arranged along an optical axis.

17. Optical arrangement according to claim 1, wherein the phase element is provided at a distance of a maximum of 2 mm from the phase or phase and amplitude spatial light modulator.

18. Optical arrangement according to claim 1, wherein the phase element is provided with a low tolerance of ±5 mm in an optically conjugated plane of the spatial light modulator.

19. Optical arrangement according to claim 1, wherein the optical system comprises a fading aperture that allows the zero order of diffraction of the superimposed light contributions to pass through.

20. Optical arrangement according to claim 19, wherein the fading aperture allows only the zero order of diffraction of the superimposed light contributions to pass through.

21. Optical arrangement according to claim 1, wherein at least one area of the spatial light modulator comprises a distinguished optical path, wherein the distinguished optical path is configured to contribute to a superposition; and
wherein the phase element is provided in the distinguished optical path between the spatial light modulators and the area of superposition; and
wherein the phase element is configured such that the phase of the distinguished optical path has a specific phase in the area of the superposition.

22. Optical arrangement according to claim 1, wherein several areas of the spatial light modulator are configured to modulate several different distinguished optical paths, wherein the optical paths are each configured to contribute to a superposition; and
wherein the phase element is configured to vary the phases of the light contribution that propagate along several different distinguished optical paths to a different extent.

23. Optical arrangement according to claim 1, wherein two areas of the spatial light modulator are configured to modulate two different distinguished optical paths, wherein the optical paths are each configured to contribute to a superposition; and
wherein the phase element is configured to adjust a difference of the phase changes of the light contributions that propagate along the two different distinguished optical paths from 90°±10°.

24. Optical arrangement according to claim 1, wherein an area of the spatial light modulator that is configured to be uniformly controlled is allocated to several areas of the phase element.

25. Optical arrangement according to claim 1, wherein at least four areas of the phase element with different phase influence form the complex modulation cell with two areas of the spatial light modulator.

26. Optical arrangement according to claim 1, wherein at least two areas of the phase element with different phase influence form a modulation cell for providing positive and negative amplitudes at a system output with an area of the spatial light modulator.

27. Optical arrangement according to claim 1, wherein several areas of the phase element that form a complex modulation cell with several areas of the spatial light modulator comprise at least three areas with different phase influence; and
wherein a difference between an angle of a first phase influence and an angle of a second phase influence is between 5 and 60 degrees or between 60 degrees and 150 degrees or between 80 degrees and 100 degrees or between 85 degrees and 95 degrees or between 110 degrees and 130 degrees or between 115 degrees and 125 degrees; and wherein the optical system is configured to allow a superposition of the optical paths belonging to the complex modulation cell.

28. Optical arrangement according to claim 1, wherein several areas of the phase element that form a complex modulation cell with several areas of the spatial light modulator comprise exactly n areas with different phase influence; and wherein a difference between an angle of a first phase influence and an angle of a second phase influence is equal to 360°/n with a tolerance of ±360°/(2n).

29. Optical arrangement according to claim 1, wherein the phase element is provided in a mechanically exchangeable manner.

30. Optical arrangement according to claim 1, wherein the spatial light modulator and the phase element form a plurality of complex modulation cells; and wherein the optical system is configured to image the plurality of complex modulation cells separately.

31. Optical arrangement according to claim 1,
wherein at least two phase stages are distributed spatially on the phase element and configured such that, together with the spatial light modulator, a combination of adjacent modulator pixels spans a partial area of a complex field strength plane or spans the entire complex field strength plane.

32. Optical arrangement according to claim 1,
wherein the optical arrangement is configured such that a diffraction image of the modulator cells is generated.

33. Optical arrangement according to claim 1,
wherein the optical arrangement is configured such that each point of a light field is controlled by a group of at least two image points (pixels) of the spatial light modulator.

34. Optical arrangement according to claim 1, wherein the optical system is configured to image a group of at least four adjacent areas of the spatial light modulator comprising, in a first direction, an extension of at least two adjacent areas of the spatial light modulator and comprising, in a second direction, an extension of at least two adjacent areas of the spatial light modulator, as a complex modulation cell.

35. Optical arrangement according to claim 1, wherein the optical arrangement is configured to adapt the optical low-pass filter, which is configured to allow superimposed imaging of several areas of the spatial light modulator, in dependence on a light wavelength.

36. Optical arrangement according to claim 1, wherein the optical arrangement comprises at least one tilting mirror, wherein the phase element is arranged such that two areas of the tilting mirror that move in opposite directions with respect to an optical axis due to mechanical coupling during deflection of the tilting mirror are allocated to two areas providing different phase contributions.

37. Optical arrangement according to claim 36, wherein at least one tilting mirror is configured to generate a phase contribution that is variable in a direction perpendicular to the optical axis, wherein the phase element is configured to provide a first phase contribution in a first area of the tilting mirror and to provide a second phase contribution in a second area of the tilting mirror, wherein the phase contribution of the tilting mirror is either locally continuous or locally variable in a linear manner across the first and the second area.

38. Optical arrangement according to claim 36, wherein the phase element is configured to realize a non-continuous phase curve by using a tilting mirror providing a locally constant phase contribution that depends on a deflection of the tilting mirror.

39. Optical arrangement according to claim 36,
wherein the phase element is arranged such that a phase jump of at least 90 degrees is allocated, by the phase element, to two areas of a tilting mirror providing a locally constant phase contribution that depends on a deflection of the tilting mirror.

40. Optical arrangement for generating light field distributions that are adjustable with varying amplitude and polarization, comprising:
    a programmable spatial light modulator;
    a polarization element; and
    an optical system;
    wherein the polarization element is configured to effect at least two or more polarization contributions on adjacent modulator pixels or to apply at least two different polarization filters to adjacent modulator pixels,
    wherein the optical system is configured to image several areas of the spatial light modulator in a superimposed manner;
    wherein the spatial light modulator and the polarization element are arranged within a depth of field of a plane or conjugated optical mask planes and
    wherein the optical arrangement is configured to realize a light value with predeterminable amplitude and predeterminable polarization in a subsequent image plane,
    wherein the optical arrangement comprises an optical low pass filter for limiting a diffraction intensity in a pupil plane, which is dimensioned such that two or more adjacent image points (pixels) of the spatial light modulator are superimposed to an effective image point in the image plane.

41. Optical arrangement according to claim 40, wherein the optical arrangement further comprises a phase element that is configured to effect at least two or more phase contributions on adjacent modulator image points.

* * * * *

UNITED STATES PATENT AND TRADEMARK OFFICE
CERTIFICATE OF CORRECTION

| | | |
|---|---|---|
| PATENT NO. | : 11,668,961 B2 | |
| APPLICATION NO. | : 16/355424 | |
| DATED | : June 6, 2023 | |
| INVENTOR(S) | : Joerg Heber et al. | |

It is certified that error appears in the above-identified patent and that said Letters Patent is hereby corrected as shown below:

On the Title Page

Please insert the text below under item (30) Foreign Application Priority Data:
--Sep. 16, 2016 (DE) .................... 1020162177850--

Signed and Sealed this
Twentieth Day of February, 2024

*Katherine Kelly Vidal*

Katherine Kelly Vidal
*Director of the United States Patent and Trademark Office*